United States Patent
Zhang et al.

(10) Patent No.: US 11,664,917 B1
(45) Date of Patent: May 30, 2023

(54) TECHNIQUES FOR INTER-BASE STATION MESSAGING FOR INTER-BASE STATION CROSS-LINK INTERFERENCE MITIGATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US); Jelena Damnjanovic, Del Mar, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/525,579

(22) Filed: Nov. 12, 2021

(51) Int. Cl.
*H04W 88/04* (2009.01)
*H04J 11/00* (2006.01)
(Continued)

(52) U.S. Cl.
CPC ......... *H04J 11/0056* (2013.01); *H04W 72/20* (2023.01); *H04W 72/541* (2023.01); *H04W 88/04* (2013.01); *H04W 52/243* (2013.01)

(58) Field of Classification Search
CPC . H04J 11/0056; H04W 72/20; H04W 72/541; H04W 88/04; H04W 52/243
See application file for complete search history.

(56) References Cited

U.S. PATENT DOCUMENTS

| 10,212,651 | B2 * | 2/2019 | Gulati | .............. H04W 24/10 |
| 10,644,845 | B2 * | 5/2020 | Yang | ............. H04L 5/0053 |

(Continued)

FOREIGN PATENT DOCUMENTS

| WO | WO-2021000303 A1 * | 1/2021 | .......... H04B 17/336 |
| WO | WO-2022021343 A1 * | 2/2022 | |

(Continued)

OTHER PUBLICATIONS

Fujitsu: "Cross-link Interference Mitigation Considerations for Duplexing Flexibility", 3GPP TSG RAN WG1 Meeting #88, R1-1701922_Interference Mitigation, 3rd Generation partnership project (3GPP), Mobile Competence Centre, 650, Route Des Lucioles, F-06921, Sophia-antipolis Cedex, France, vol. RAN WG1, No. Athens, Greece, Feb. 13, 2017-Feb. 17, 2017, Feb. 12, 2017, XP051209085, pp. 1-3, Paragraph 02.2, Figure 3.

(Continued)

*Primary Examiner* — Hai V Nguyen
(74) *Attorney, Agent, or Firm* — Holland & Hart LLP

(57) ABSTRACT

Methods, systems, and devices for wireless communications are described. A first relay user equipment (UE) may be configured to receive a first message including a cross-link interference (CLI) indication associated with CLI experienced by a first base station which is associated with signals transmitted by a second base station. The first relay UE may generate, in response to the first message, a second message including the CLI indication, and may transmitting the second message including the CLI indication. In some cases, the first relay UE may transmit the second message directly to the second base station. In additional or alternative cases, the first relay UE may transmit the second message to an additional relay UE for relay to the second base station.

30 Claims, 18 Drawing Sheets

(51) Int. Cl.
  *H04W 72/20*    (2023.01)
  *H04W 72/541*   (2023.01)
  *H04W 52/24*    (2009.01)

(56) References Cited

U.S. PATENT DOCUMENTS

| | | | | |
|---|---|---|---|---|
| 10,911,191 | B2* | 2/2021 | Masal | H04L 27/26025 |
| 11,025,399 | B2* | 6/2021 | Esswie | H04B 7/0413 |
| 11,177,983 | B2* | 11/2021 | Harrebek | H04L 5/0051 |
| 11,202,218 | B2* | 12/2021 | Kim | H04W 24/10 |
| 11,277,213 | B2* | 3/2022 | Xu | H04L 5/1469 |
| 11,374,705 | B2* | 6/2022 | Masal | H04J 11/0056 |
| 11,375,527 | B1* | 6/2022 | Eyuboglu | H04B 7/15528 |
| 11,394,587 | B2* | 7/2022 | Kang | H04L 27/2607 |
| 11,533,236 | B2* | 12/2022 | Xu | H04L 41/0806 |
| 11,533,644 | B2* | 12/2022 | Wang | H04W 24/08 |
| 11,540,236 | B2* | 12/2022 | Ibrahim | H04W 52/54 |
| 11,553,483 | B2* | 1/2023 | Hwang | H04W 72/0446 |
| 11,558,088 | B1* | 1/2023 | Gutman | H04B 7/0695 |
| 2009/0116443 | A1* | 5/2009 | Walker | H04W 36/30 455/445 |
| 2015/0029866 | A1* | 1/2015 | Liao | H04W 48/14 370/254 |
| 2016/0337954 | A1* | 11/2016 | Gulati | H04W 48/17 |
| 2017/0086114 | A1* | 3/2017 | Jung | H04W 52/46 |
| 2018/0152949 | A1 | 5/2018 | Guo et al. | |
| 2018/0323916 | A1* | 11/2018 | Yang | H04L 5/0053 |
| 2018/0323928 | A1* | 11/2018 | Yang | H04L 5/0051 |
| 2018/0352411 | A1* | 12/2018 | Ryu | H04B 7/155 |
| 2018/0367287 | A1* | 12/2018 | Chen | H04L 25/0224 |
| 2018/0367346 | A1* | 12/2018 | Chen | H04L 1/0026 |
| 2019/0261379 | A1* | 8/2019 | Yerramalli | H04W 4/08 |
| 2019/0312693 | A1* | 10/2019 | Belleschi | H04W 56/002 |
| 2020/0008087 | A1* | 1/2020 | Papaleo | H04J 11/0056 |
| 2020/0036500 | A1* | 1/2020 | Zhu | H04L 5/0073 |
| 2020/0044764 | A1* | 2/2020 | Xu | H04W 24/10 |
| 2020/0106575 | A1* | 4/2020 | Masal | H04J 11/0056 |
| 2020/0213052 | A1* | 7/2020 | Li | H04W 72/23 |
| 2020/0228212 | A1* | 7/2020 | Xu | H04L 5/1469 |
| 2020/0228213 | A1* | 7/2020 | Masal | H04L 5/0023 |
| 2020/0229009 | A1* | 7/2020 | Xu | H04B 17/24 |
| 2020/0275298 | A1* | 8/2020 | Xu | H04W 56/001 |
| 2020/0322962 | A1* | 10/2020 | Wang | H04W 72/541 |
| 2020/0351065 | A1* | 11/2020 | Esswie | H04L 5/0092 |
| 2020/0351690 | A1* | 11/2020 | Zhu | H04W 24/10 |
| 2020/0358878 | A1* | 11/2020 | Bansal | H04L 63/0236 |
| 2020/0389805 | A1* | 12/2020 | Kim | H04L 1/0027 |
| 2021/0006438 | A1* | 1/2021 | Harrebek | H04W 24/10 |
| 2021/0006997 | A1* | 1/2021 | Jin | H04L 5/0048 |
| 2021/0021355 | A1* | 1/2021 | Hwang | H04W 8/24 |
| 2021/0045130 | A1* | 2/2021 | Tang | H04W 72/0446 |
| 2021/0050983 | A1* | 2/2021 | Manolakos | H04W 24/10 |
| 2021/0126752 | A1* | 4/2021 | Masal | H04L 27/2613 |
| 2021/0227411 | A1* | 7/2021 | Luo | H04W 24/08 |
| 2021/0227552 | A1* | 7/2021 | Abedini | H04B 7/0617 |
| 2021/0250797 | A1* | 8/2021 | Karjalainen | H04L 5/0044 |
| 2021/0306220 | A1* | 9/2021 | Xu | H04W 24/08 |
| 2021/0321268 | A1* | 10/2021 | Ly | H04J 11/0056 |
| 2021/0321281 | A1* | 10/2021 | Wei | H04B 17/336 |
| 2021/0328692 | A1* | 10/2021 | Zhang | H04B 7/088 |
| 2021/0359831 | A1* | 11/2021 | Abedini | H04L 5/1461 |
| 2021/0409993 | A1* | 12/2021 | Fakoorian | H04B 17/24 |
| 2022/0006501 | A1* | 1/2022 | Kim | H04B 7/0632 |
| 2022/0015114 | A1* | 1/2022 | Xu | H04B 17/345 |
| 2022/0021507 | A1* | 1/2022 | Cao | H04W 72/1268 |
| 2022/0022206 | A1* | 1/2022 | Ibrahim | H04W 24/08 |
| 2022/0046459 | A1* | 2/2022 | Kim | H04B 17/345 |
| 2022/0060265 | A1* | 2/2022 | Xu | H04W 24/08 |
| 2022/0086672 | A1* | 3/2022 | Abedini | H04L 5/0053 |
| 2022/0095144 | A1* | 3/2022 | Ren | H04J 11/003 |
| 2022/0095240 | A1* | 3/2022 | Ying | H04W 52/243 |
| 2022/0103270 | A1* | 3/2022 | Miao | H04B 17/345 |
| 2022/0103333 | A1* | 3/2022 | Ghozlan | H04W 88/08 |
| 2022/0104057 | A1* | 3/2022 | Abedini | H04W 92/12 |
| 2022/0104061 | A1* | 3/2022 | Abedini | H04W 72/541 |
| 2022/0104214 | A1* | 3/2022 | Ying | H04J 11/0036 |
| 2022/0116898 | A1* | 4/2022 | Ying | H04W 56/005 |
| 2022/0159596 | A1* | 5/2022 | Kim | H04B 17/336 |
| 2022/0247467 | A1* | 8/2022 | Huang | H04L 5/0051 |
| 2022/0248383 | A1* | 8/2022 | Park | H04W 72/23 |
| 2022/0255647 | A1* | 8/2022 | Sahraei | H04B 17/345 |
| 2022/0302984 | A1* | 9/2022 | Suh | H04B 17/19 |
| 2022/0312178 | A1* | 9/2022 | Wu | H04L 43/16 |
| 2022/0312232 | A1* | 9/2022 | Nam | H04W 24/08 |
| 2022/0312504 | A1* | 9/2022 | Zhang | H04L 5/1461 |
| 2022/0321199 | A1* | 10/2022 | Abedini | H04L 41/0813 |
| 2022/0329462 | A1* | 10/2022 | Kang | H04L 5/0073 |
| 2022/0329481 | A1* | 10/2022 | Nelson | G06F 3/0679 |
| 2022/0394529 | A1* | 12/2022 | Kurita | H04B 17/318 |
| 2023/0007515 | A1* | 1/2023 | Xu | H04W 24/10 |
| 2023/0021157 | A1* | 1/2023 | Ren | H04B 17/336 |

FOREIGN PATENT DOCUMENTS

| | | |
|---|---|---|
| WO | WO-2022151000 A1 * | 7/2022 |
| WO | WO-2022236767 A1 * | 11/2022 |
| WO | WO-2022242820 A1 * | 11/2022 |

OTHER PUBLICATIONS

Huawei, et al., "Consideration on Cross-Link Interference in IAB", 3GPP TSG RAN WG1 Meeting #95, R1-1812203, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 10 Pages, XP051554075, Consideration on CLI measurement framework, p. 5, Paragraph 3.1—p. 7, Figures 8, 9 Consideration on CLI mitigation method, p. 7, Paragraph 3.2—p. 8, Paragraph "3 Inter-IAB node CLI", Paragraph 0003.

International Search Report and Written Opinion—PCT/US2022/078294—ISA/EPO—dated Feb. 7, 2023.

Motorola: "HeNB Interference Management", 3GPP TSG-RAN WG1#60, R1-101121, Henb Interference Management, 3rd Generation partnership project (3GPP), Mobile Competence Centre, 650, Route Des Lucioles, F-06921, Sophia-antipolis Cedex, France, vol. RAN WG1, No. San Francisco, USA, Feb. 22, 2010-Feb. 26, 2010, Feb. 17, 2010, XP050598087, 4 Pages, Paragraph [0003].

* cited by examiner

TECHNIQUES FOR INTER-BASE STATION MESSAGING FOR INTER-BASE STATION CROSS-LINK INTERFERENCE MITIGATION

FIELD OF TECHNOLOGY

The following relates to wireless communications, including techniques for inter-base station messaging for inter-base station cross-link interference (CLI) mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a "victim" base station may experience cross-link interference (CLI) from an "aggressor" base station when downlink signals transmitted by the aggressor base station interfere with uplink signals received by the victim base station. This may be referred to as "inter-gNB CLI." However, conventional techniques for indicating and mitigating inter-gNG CLI are deficient.

SUMMARY

The described techniques relate to improved methods, systems, devices, and apparatuses that support techniques for inter-base station messaging for inter-base station cross-link interference (CLI) mitigation. Generally, the described techniques provide techniques which enable indications of inter-gNB CLI to be communicated between victim and aggressor base stations using one or more "relay UEs." In particular, aspects of the present disclosure support signaling which enables relay UEs to relay indications of high CLI experienced by a victim base station to aggressor base stations in order to mitigate inter-gNB CLI. For example, upon detecting inter-gNB CLI, a victim base station may transmit a high CLI indication to a relay UE. In cases where the relay UE is served by both the victim and aggressor base stations, the relay UE may forward/relay the high CLI indication directly to the aggressor base station. Resources and/or beams used to receive and transmit the high CLI indication at the relay UE may be configured by the victim base station and/or the aggressor base station. Conversely, in cases where the relay UE is not served by the aggressor base station, the relay UE may identify other relay UEs which are served by the aggressor and which may relay the high-CLI indication, such as through sidelink discovery messages. By enabling high-CLI indications to be communicated between base stations using relay UEs, techniques described herein may increase the effective range of the victim base station, and may lead to decreased inter-gNB CLI.

A method for wireless communication at a first relay UE is described. The method may include receiving a first message including a CLI indication associated with CLI experienced by a first base station which is associated with signals transmitted by a second base station, generating, at least in part in response to the first message, a second message including the CLI indication, and transmitting the second message including the CLI indication to the second base station, to a second relay UE for relay to the second base station, or both.

An apparatus for wireless communication at a first relay UE is described. The apparatus may include a processor, memory coupled with the processor, and instructions stored in the memory. The instructions may be executable by the processor to cause the apparatus to receive a first message including a CLI indication associated with CLI experienced by a first base station which is associated with signals transmitted by a second base station, generate, at least in part in response to the first message, a second message including the CLI indication, and transmit the second message including the CLI indication to the second base station, to a second relay UE for relay to the second base station, or both.

Another apparatus for wireless communication at a first relay UE is described. The apparatus may include means for receiving a first message including a CLI indication associated with CLI experienced by a first base station which is associated with signals transmitted by a second base station, means for generating, at least in part in response to the first message, a second message including the CLI indication, and means for transmitting the second message including the CLI indication to the second base station, to a second relay UE for relay to the second base station, or both.

A non-transitory computer-readable medium storing code for wireless communication at a first relay UE is described. The code may include instructions executable by a processor to receive a first message including a CLI indication associated with CLI experienced by a first base station which is associated with signals transmitted by a second base station, generate, at least in part in response to the first message, a second message including the CLI indication, and transmit the second message including the CLI indication to the second base station, to a second relay UE for relay to the second base station, or both.

Some examples of the method, apparatuses, and non-transitory computer-readable medium described herein may further include operations, features, means, or instructions for receiving, via the first base station, the second base station, or both, control signaling including an indication of a resource to relay the CLI indication, where the second message may be generated in response to the control signaling, and where the second message may be transmitted within the resource.

Some examples of the method, apparatuses, and non-transitory computer-readable medium described herein may further include operations, features, means, or instructions for receiving, via the first base station, the second base station, or both, control signaling including one or more relay selection criteria for relaying the CLI indication, where the first relay UE generates and transmits the second message based on a satisfaction of the one or more relay selection criteria.

In some examples of the method, apparatuses, and non-transitory computer-readable medium described herein, the satisfaction of the one or more relay selection criteria may be based on a first signal strength associated with signals received at the first relay UE from the first base station, a second signal strength associated with signals received at the first relay UE from the second base station, or both, satisfying a threshold signal strength.

Some examples of the method, apparatuses, and non-transitory computer-readable medium described herein may further include operations, features, means, or instructions for transmitting the second message based on a comparison of a first priority associated with receiving and forwarding the CLI indication and a second priority associated with additional traffic that may be to be transmitted or received by the first relay UE.

Some examples of the method, apparatuses, and non-transitory computer-readable medium described herein may further include operations, features, means, or instructions for receiving, from the first base station, the second base station, or both, an indication of a priority configuration associated with a relative priority between the CLI indication and the additional traffic, where the comparison may be based on the priority configuration.

Some examples of the method, apparatuses, and non-transitory computer-readable medium described herein may further include operations, features, means, or instructions for receiving control signaling including an indication of a set of power control parameters associated with communications performed with the second base station, where the second message may be transmitted to the second base station in accordance with the set of power control parameters.

In some examples of the method, apparatuses, and non-transitory computer-readable medium described herein, the control signaling including the indication of the set of power control parameters may be received via the first base station, the second base station, or both and the set of power control parameters includes a transmit power value, an alpha value, a closed loop index, a path loss reference signal (PL RS), or any combination thereof.

Some examples of the method, apparatuses, and non-transitory computer-readable medium described herein may further include operations, features, means, or instructions for receiving, from the first base station, a downlink message associated with a beam management procedure performed between the first relay UE and the first base station, where the first message may be received from the first base station based on a receive beam at the first relay UE that was determined in accordance with the beam management procedure.

Some examples of the method, apparatuses, and non-transitory computer-readable medium described herein may further include operations, features, means, or instructions for receiving, from the first base station, the second base station, or both, a downlink message associated with a beam management procedure performed between the first relay UE the first base station or the second base station, respectively, where the second message may be transmitted to the second base station based on a transmit beam at the first relay UE that was determined in accordance with the beam management procedure.

Some examples of the method, apparatuses, and non-transitory computer-readable medium described herein may further include operations, features, means, or instructions for receiving beam management information associated with identifying a transmit beam at the first relay UE for transmitting the second message, where the second message may be transmitted based at least in part on the transmit beam that may be identified in accordance with the beam management information.

Some examples of the method, apparatuses, and non-transitory computer-readable medium described herein may further include operations, features, means, or instructions for receiving, from the second relay UE, a sidelink message associated with a beam management procedure performed between the first relay UE and the second relay UE, where the second message may be transmitted to the second relay UE based on a transmit beam at the first relay UE that was determined in accordance with the beam management procedure, and where the second message includes an indication for the second relay UE to relay the CLI indication to the second base station.

Some examples of the method, apparatuses, and non-transitory computer-readable medium described herein may further include operations, features, means, or instructions for receiving the first message from the first base station, where the first message includes an identifier associated with the second base station and transmitting the second message to the second base station based on the identifier.

Some examples of the method, apparatuses, and non-transitory computer-readable medium described herein may further include operations, features, means, or instructions for generating, at least in part in response to the first message, a third message including the additional CLI indication and transmitting the third message including the additional CLI indication to the third base station.

In some examples of the method, apparatuses, and non-transitory computer-readable medium described herein, where the second message may be transmitted within a first transmission time interval (TTI) and the third message may be transmitted within a second TTI different from the first TTI and where the second message may be transmitted via a first transmit beam associated with a first spatial orientation and the third message may be transmitted via a second transmit beam associated with a second spatial orientation different from the first spatial orientation.

Some examples of the method, apparatuses, and non-transitory computer-readable medium described herein may further include operations, features, means, or instructions for identifying, based on the first message, that the first relay UE may be unable to communicate with the second base station, receiving, from the second relay UE and based on the identifying, a sidelink message including an indication of at least one serving base station associated with the second relay UE, the at least one serving base station including the second base station, and transmitting the second message to the second relay UE based on receiving the sidelink message, where the second message includes an indication for the second relay UE to relay the CLI indication to the second base station.

Some examples of the method, apparatuses, and non-transitory computer-readable medium described herein may further include operations, features, means, or instructions for transmitting a request to at least the second relay UE based on identifying that the first relay UE may be unable to communicate with the second base station, where the sidelink message may be received in response to the request.

Some examples of the method, apparatuses, and non-transitory computer-readable medium described herein may further include operations, features, means, or instructions for receiving a feedback message from the second relay UE in response to the second message.

Some examples of the method, apparatuses, and non-transitory computer-readable medium described herein may further include operations, features, means, or instructions for transmitting a scheduling request to the second base station based on receiving the first message and receiving, from the second base station in response to the scheduling request, a grant including a set of resources, where the second message may be transmitted to the second base station within the set of resources.

Some examples of the method, apparatuses, and non-transitory computer-readable medium described herein may further include operations, features, means, or instructions for transmitting, to the second base station, a random access message of a random access procedure between the first relay UE and the second base station, where the random access message includes a request for a grant and receiving, from the second base station in response to the random access message, the grant including a set of resources, where the second message may be transmitted to the second base station within the set of resources.

Some examples of the method, apparatuses, and non-transitory computer-readable medium described herein may further include operations, features, means, or instructions for transmitting, to the second base station, a random access message of a random access procedure between the first relay UE and the second base station, where the second message including the CLI indication includes the random access message.

A method for wireless communication at a first base station is described. The method may include receiving a signal from a second base station, measuring CLI at the first base station that is associated with the signal received from the second base station, and transmitting a message including a CLI indication to a relay UE served by the first base station based on the measured CLI satisfying an interference threshold, where the CLI indication is transmitted to the relay UE for relay to the second base station.

An apparatus for wireless communication at a first base station is described. The apparatus may include a processor, memory coupled with the processor, and instructions stored in the memory. The instructions may be executable by the processor to cause the apparatus to receive a signal from a second base station, measure CLI at the first base station that is associated with the signal received from the second base station, and transmit a message including a CLI indication to a relay UE served by the first base station based on the measured CLI satisfying an interference threshold, where the CLI indication is transmitted to the relay UE for relay to the second base station.

Another apparatus for wireless communication at a first base station is described. The apparatus may include means for receiving a signal from a second base station, means for measuring CLI at the first base station that is associated with the signal received from the second base station, and means for transmitting a message including a CLI indication to a relay UE served by the first base station based on the measured CLI satisfying an interference threshold, where the CLI indication is transmitted to the relay UE for relay to the second base station.

A non-transitory computer-readable medium storing code for wireless communication at a first base station is described. The code may include instructions executable by a processor to receive a signal from a second base station, measure CLI at the first base station that is associated with the signal received from the second base station, and transmit a message including a CLI indication to a relay UE served by the first base station based on the measured CLI satisfying an interference threshold, where the CLI indication is transmitted to the relay UE for relay to the second base station.

Some examples of the method, apparatuses, and non-transitory computer-readable medium described herein may further include operations, features, means, or instructions for transmitting, to the relay UE, control signaling including an indication of a resource to relay the CLI indication to the second base station, an additional relay UE, or both.

Some examples of the method, apparatuses, and non-transitory computer-readable medium described herein may further include operations, features, means, or instructions for transmitting, to the relay UE, control signaling including one or more relay selection criteria for relaying the CLI indication.

Some examples of the method, apparatuses, and non-transitory computer-readable medium described herein may further include operations, features, means, or instructions for transmitting, to the relay UE, an indication of a priority configuration associated with a relative priority between the CLI indication and additional traffic at the relay UE.

Some examples of the method, apparatuses, and non-transitory computer-readable medium described herein may further include operations, features, means, or instructions for transmitting, to the relay UE, control signaling including an indication of a set of power control parameters associated with communications performed with the second base station, where the set of power control parameters includes a transmit power value, an alpha value, a closed loop index, a PL RS, or any combination thereof.

A method for wireless communication at a second base station is described. The method may include receiving, from a relay UE that is served by the second base station, a message including a CLI indication associated with CLI experienced at a first base station that is attributable to signals transmitted by the second base station, selectively adjusting one or more communications parameters associated with communications at the second base station based on the CLI indication, and communicating with one or more wireless devices in accordance with the one or more adjusted communications parameters.

An apparatus for wireless communication at a second base station is described. The apparatus may include a processor, memory coupled with the processor, and instructions stored in the memory. The instructions may be executable by the processor to cause the apparatus to receive, from a relay UE that is served by the second base station, a message including a CLI indication associated with CLI experienced at a first base station that is attributable to signals transmitted by the second base station, selectively adjust one or more communications parameters associated with communications at the second base station based on the CLI indication, and communicate with one or more wireless devices in accordance with the one or more adjusted communications parameters.

Another apparatus for wireless communication at a second base station is described. The apparatus may include means for receiving, from a relay UE that is served by the second base station, a message including a CLI indication associated with CLI experienced at a first base station that is attributable to signals transmitted by the second base station, means for selectively adjusting one or more communications parameters associated with communications at the second base station based on the CLI indication, and means for communicating with one or more wireless devices in accordance with the one or more adjusted communications parameters.

A non-transitory computer-readable medium storing code for wireless communication at a second base station is described. The code may include instructions executable by a processor to receive, from a relay UE that is served by the second base station, a message including a CLI indication associated with CLI experienced at a first base station that is attributable to signals transmitted by the second base station, selectively adjust one or more communications parameters associated with communications at the second base station based on the CLI indication, and communicate with one or more wireless devices in accordance with the one or more adjusted communications parameters.

Some examples of the method, apparatuses, and non-transitory computer-readable medium described herein may further include operations, features, means, or instructions for transmitting, to the relay UE, control signaling including an indication of a resource to relay the CLI indication to the second base station, where the message may be received within the resource.

Some examples of the method, apparatuses, and non-transitory computer-readable medium described herein may further include operations, features, means, or instructions for transmitting, to the relay UE, control signaling including an indication of a set of power control parameters associated with communications performed with the second base station, where the set of power control parameters includes a transmit power value, an alpha value, a closed loop index, a PL RS, or any combination thereof.

Some examples of the method, apparatuses, and non-transitory computer-readable medium described herein may further include operations, features, means, or instructions for transmitting, to the relay UE, a downlink message associated with a beam management procedure performed between the relay UE and the second base station, where the message may be transmitted by the relay UE to the second base station based on a transmit beam at the relay UE that was determined in accordance with the beam management procedure.

In some examples of the method, apparatuses, and non-transitory computer-readable medium described herein, the one or more communications parameters include a transmit beam used to transmit signals by the second base station, a transmit power associated with signals transmitted by the second base station, resource configurations including uplink and downlink resources used for communications at the second base station, or any combination thereof.

DETAILED DESCRIPTION

Figure 1:
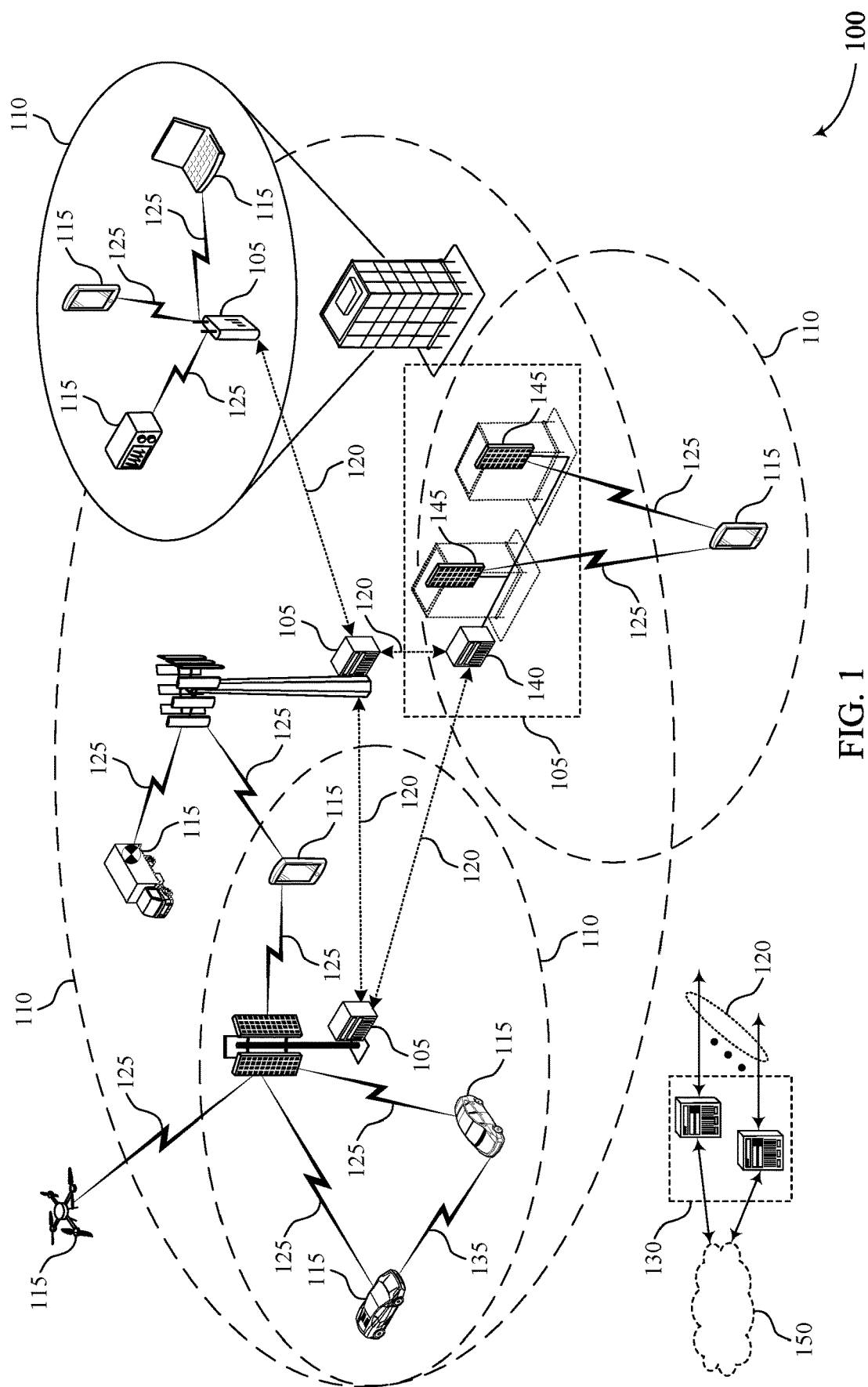
FIG. 1 illustrates an example of a wireless communications system that supports techniques for inter-base station messaging for inter-base station cross-link interference (CLI) mitigation in accordance with aspects of the present disclosure.

In some wireless communications systems, a "victim" base station may experience cross-link interference (CLI) from an "aggressor" base station when downlink signals transmitted by the aggressor base station interfere with uplink signals received by the victim base station. This may be referred to as "inter-gNB CLI." Inter-gNB CLI may be particularly prevalent in the context of full-duplex (FD) communications in which the base stations are configured to transmit and receive signals simultaneously. Upon detecting high CLI, a victim base station may need to send an indication of the high CLI to the aggressor base station to mitigate the inter-gNB CLI. However, the victim base station may not be able to reach the aggressor base station in some circumstances. For example, the victim base station may be unable to communicate a high CLI indication to the aggressor base station in cases where the base stations are located far away from one another, and in cases where a transmit power imbalance between the base stations prevents signals from the victim base station from being successfully received at the aggressor base station. In such cases, conventional techniques for mitigating inter-gNB CLI may be unsuccessful, leading to unresolved CLI at the victim base station.

Accordingly, aspects of the present disclosure are directed techniques which enable indications of inter-gNB CLI to be communicated between victim and aggressor base stations using one or more "relay UEs." In particular, aspects of the present disclosure are directed to configurations and signaling which enables relay UEs to relay indications of high CLI experienced by a victim base station to aggressor base stations in order to mitigate inter-gNB CLI. For example, upon detecting inter-gNB CLI, a victim base station may transmit a high CLI indication to a relay UE. In cases where the relay UE is served by both the victim and aggressor base stations, the relay UE may forward/relay the high CLI indication directly to the aggressor base station. Resources and/or beams used to receive and transmit the high CLI indication at the relay UE may be configured by the victim base station and/or the aggressor base station. Conversely, in cases where the relay UE is not served by the aggressor base station, the relay UE may identify other relay UEs which are served by the aggressor and which may relay the high-CLI indication, such as through sidelink discovery messages. By enabling high-CLI indications to be communicated between base stations using relay UEs, techniques described herein may increase the effective range of the victim base station, and may lead to decreased inter-gNB CLI.

Aspects of the disclosure are initially described in the context of wireless communications systems. Additional aspects of the disclosure are described in the context of example process flows. Aspects of the disclosure are further illustrated by and described with reference to apparatus diagrams, system diagrams, and flowcharts that relate to techniques for inter-base station messaging for inter-base station CLI mitigation.

FIG. 1 illustrates an example of a wireless communications system 100 that supports techniques for inter-base station messaging for inter-base station CLI mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115, base stations 105, and other wireless devices (e.g., IAB nodes) of the wireless communications system 100 may support techniques which enable indications of inter-gNB CLI to be communicated between victim and aggressor base stations 105 using one or more relay UEs 115. In particular, the wireless devices of the wireless communications system 100 may signaling which enables relay UEs 115 to relay indications of high CLI experienced by a victim base station 105 to aggressor base stations 105 in order to mitigate inter-gNB CLI.

For example, upon detecting inter-gNB CLI, a victim base station 105 of the wireless communications system 100 may transmit a high CLI indication to a relay UE 115. In cases where the relay UE 115 is served by both the victim and aggressor base stations 105, the relay UE 115 may forward/relay the high CLI indication directly to the aggressor base station 105. Resources and/or beams used to receive and transmit the high CLI indication at the relay UE 115 may be configured by the victim base station 105 and/or the aggressor base station 105. Conversely, in cases where the relay UE 115 is not served by the aggressor base station 105, the relay UE 115 may identify other relay UEs 115 which are served by the aggressor base station 105 and which may relay the high-CLI indication, such as through sidelink discovery messages.

Techniques described herein may facilitate the communication of high-CLI indications between victim base stations 105 and aggressor base stations 105, which may inter-gNB CLI experienced within the wireless communications system 100. In particular, by enabling high-CLI indications to be communicated between base stations 105 using relay UEs 115, techniques described herein may increase the effective communication range of the victim base station 105 for communicating high-CLI indications, which may lead to decreased inter-gNB CLI, reduced noise, and higher reliability within the wireless communications system 100. Moreover, by reducing CLI experienced at victim base stations 105, techniques described herein may enable victim base stations 105 to effectively reduce a transmit power used to perform wireless communications as compared to the transmit power used in the presence of inter-gNB CLI, thereby reducing power consumption within the wireless communications system 100.

Figure 2:
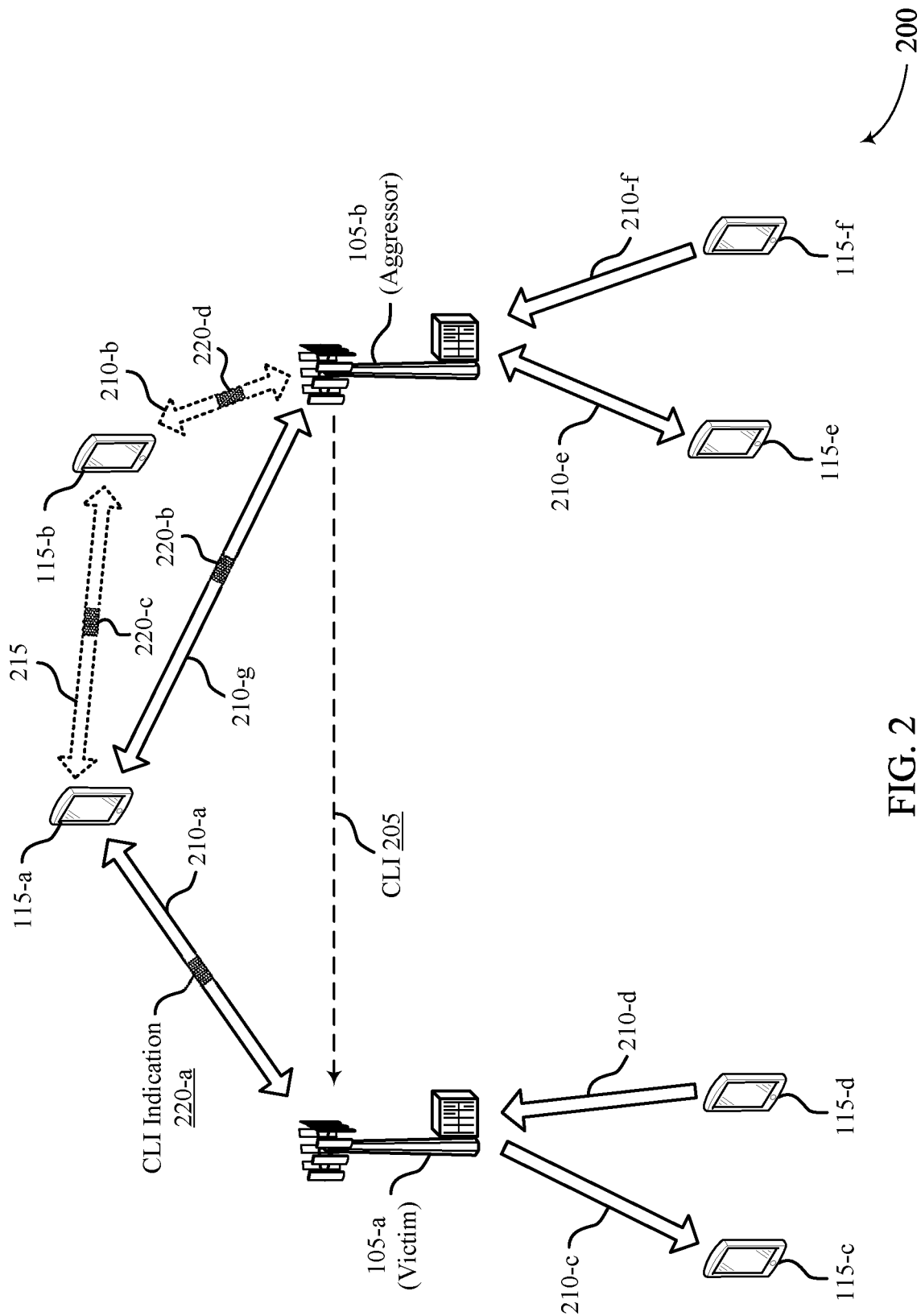
FIG. 2 illustrates an example of a wireless communications system that supports techniques for inter-base station messaging for inter-base station CLI mitigation in accordance with aspects of the present disclosure.

FIG. 2 illustrates an example of a wireless communications system 200 that supports techniques for inter-base station messaging for inter-base station CLI mitigation in accordance with aspects of the present disclosure. In some examples, wireless communications system 200 may implement, or be implemented by, aspects of wireless communications system 100. The wireless communications system 200 may include a first base station 105-a (e.g., victim base station 105-a), a second base station 105-b (e.g., aggressor base station 105-b), and a set of UEs 115-a through 115-f, which may be examples of base stations 105 and UEs 115 described with reference to FIG. 1.

Each of the UEs 115-a through 115-f may communicate with the first base station 105-a, the second base station 105-b, or both, using one or more communication links 210. For example, the first UE 115-a may communicate with the first base station 105-a and the second base station 105-b via a communication link 210-a and a communication link 210-g, respectively. Similarly, the second UE 115-b may communicate with the second base station 105-b via a communication link 210-b. In some cases, the communication links 210 may include examples of access links (e.g., Uu links). The communication links 210 may include bi-directional links that can include both uplink and downlink communication. For example, the first UE 115-a may transmit uplink transmissions, such as uplink control signals or uplink data signals, to the first base station 105-a via communication link 210-a, and the first base station 105-a may transmit downlink transmissions, such as downlink control signals or downlink data signals, to the first UE 115-a via the communication link 210-a. Similarly, the UEs 115 of the wireless communicate with one another via one or more communication links 215. For example, as shown in FIG. 2, the first UE 115-a and the second UE 115-b may communicate with one another via a communication link 215, which may be an example of a sidelink communication link or a PC5 link.

In some aspects, the UEs 115 and the base stations 105 of the wireless communications system 200 may support FD communications. The term FD communications may refer to the simultaneous (or at least partially overlapping) transmission and reception of wireless communications. In some cases, the wireless devices may support FD communications in one or more frequency ranges, such as Frequency Range 1 (FR1), Frequency Range 2 (FR2), and the like. FD capabilities may be supported at the UEs 115 of the wireless communications system 200, the base stations 105 of the wireless communications system 200, or both. For example, a UE 115 of the wireless communications system 200 may support FD communications by transmitting uplink communications via one antenna panel of the UE 115, and by receiving downlink communications via another antenna panel of the UE 115. By way of another example, a base station 105 of the wireless communications system 200 may support FD communications by receiving uplink communications via one antenna panel of the base station 105, and by transmitting downlink communications via another antenna panel of the base station 105. In some cases, FD capability at each respective wireless device may be based on (e.g., conditional on) one or more parameters or characteristics, such as beam separation, self-interference between downlink and uplink, clutter echo, and the like.

There are a number of benefits to FD communications, as compared to other communications schemes such as half-duplex (HD). First, enabling wireless devices to simultaneously transmit and receive wireless communications may lead to a latency reduction. For example, FD communications may enable UEs 115 to receive downlink signals in uplink-only slots, which may enable latency savings. Further, FD communications may lead to spectrum efficiency enhancement (e.g., spectrum efficiency enhancement per cell, per UE), more efficient resource utilization, and improve coverage enhancement with continuous uplink and downlink transmission/reception.

FD communications may be implemented in a number of ways or implementations. In a first implementation, a UE 115 may perform FD communications by receiving downlink signals from a first transmission-reception point (TRP), and simultaneously transmitting uplink signals to a second TRP. For example, the first UE 115-a of the wireless communications system 200 may perform FD communications by receiving downlink signals from the first base station 105-a and transmitting uplink signals to the second base station 105-b. In another implementation, a base station 105 may perform FD communications by transmitting downlink signals to a first UE 115, and simultaneously receiving uplink signals from a second UE 115. For example, the first base station 105-a may perform FD communications by transmitting downlink signals to the third UE 115-c, and simultaneously receiving uplink signals from the fourth UE 115-d. In yet another implementation, a UE 115 and a base station 105 may both be configured to perform FD communications with another by simultaneously performing both uplink and downlink communications with one another. For example, the first base station 105-a and the first UE 115-a may simultaneously perform both uplink and downlink communications with one another.

As noted previously herein, in some wireless communications systems, a victim base station 105 may experience CLI from an aggressor base station 105 when downlink signals transmitted by the aggressor base station 105 interfere with uplink signals received by the victim base station 105. For example, as shown in FIG. 2, downlink signals transmitted by the second base station 105-b may interfere with uplink signals received by the first base station 105-a, thereby resulting in CLI 205 (e.g., inter-gNB CLI 205). Inter-gNB CLI may be experienced in multiple cases or scenarios, including: 1) gNB in FD mode and 2) gNB in HD mode but with flexible and misaligned TDD. In other words, inter-gNB CLI may be experienced in cases where base stations 105 are configured to perform FD communications, HD communications, or both.

Some wireless communications systems have attempted to address inter-gNB CLI with inter-gNB interference management techniques. For example, upon detecting high CLI, a victim base station 105 may need to send an indication of the high CLI to the aggressor base station 105 to mitigate the inter-gNB CLI. For instance, the victim base station 105 may send an indication of the high CLI to the aggressor base station 105 so that the aggressor base station 105 may mitigate the CLI by avoiding scheduling reverse link transmission (e.g., downlink transmission) that cause strong inter-gNB CLI to uplink reception at the victim base station 105. However, the victim base station 105 may not be able to reach the aggressor base station 105 in some circumstances. For example, the victim base station 105 may be unable to communicate a high-CLI indication via over-the-air (OTA) signaling to the aggressor base station 105 in cases where the base stations 105 are located far away from one another, and in cases where a transmit power imbalance between the base stations 105 prevents OTA signaling from the victim base station 105 from being successfully received at the aggressor base station 105. In such cases, conventional techniques for mitigating inter-gNB CLI may be unsuccessful, leading to unresolved CLI at the victim base station 105.

Accordingly, the UEs 115 and the base stations 105 of the wireless communications system 200 may support techniques which enable indications of inter-gNB CLI to be communicated between the victim base station 105-a and the aggressor base station 105-b using one or more relay UEs 115. In particular, the wireless communications system 200 may support configurations and signaling which enables relay UEs 115 to relay indications of high CLI experienced by the victim base station 105-a to the aggressor base station 105-b in order to mitigate inter-gNB CLI.

For example, in some cases, the first UE 115-a may be served by both the first base station 105-a and the second base station 105-b. In such cases, the first UE 115-b may be configured to communicate with the first base station 105-a and the second base station 105-b via the communication link 210-a and the communication link 210-b, respectively. In this example, the first base station 105-a may experience CLI 205, and may determine that CLI 205 experienced at the first base station 105-a satisfies some threshold. That is, the first base station 105-a may identify a high-CLI condition at the first base station 105-a when downlink signals from the second base station 105-b interfere with uplink signals at the first base station 105-a.

Upon identifying a high-CLI condition, the first base station 105-a may identify and configure one or more relay UEs 115 which may be used to relay a CLI indication 220 to the second base station 105-b. In some cases, the first base station 105-b may identify relay UEs 115 which may be used to relay the CLI indication upon identifying that the first base station 105-a is unable to transmit the CLI indication 220 directly to the second base station 105-b, such as due to the relative positions of the base stations 105, an imbalance in transmit powers between the base stations 105, or both.

In some implementations, the first base station 105-*a* may request or instruct all UEs 115 which are within a geographic coverage area of the first base station 105-*a* to relay the CLI indication 220 to the second base station 105-*b* (e.g., UEs 115-*a*, 115-*c*, 115-*d*). For example, the first base station 105-*a* may broadcast a message (e.g., RRC message, downlink control information (DCI) message, synchronization signal block (SSB) message) including a CLI indication 220-*a*, where the broadcast message includes a request or instruction for each UE 115 to relay or forward the CLI indication 220-*a* to the second base station 105-*b*. In other cases, the first base station 105-*b* may configure or dynamically schedule (e.g., via unicast signaling, multicast signaling, broadcast signaling) one or more UEs 115 to relay the CLI indication 220-*a*. For example, as shown in FIG. 2, the first base station 105-*a* may transmit a control message to the first UE 115-*a*, where the control message includes the CLI indication 220-*a* and an instruction to relay/forward the CLI indication 220-*a* to the second base station 105-*b* (e.g., instruction to relay inter-gNB messages).

In some implementations, a serving base station 105 (e.g., first base station 105-*b*, second base station 105-*b*) may configure relay UEs 115 with a set of criterion for qualified relaying UEs 115. That is, a serving base station 105 may indicate a set of relay selection criteria (e.g., relay trigger conditions) for relaying the CLI indication 220 which (e.g., relay selection criteria/trigger conditions which, if satisfied, cause the respective relay UE(s) 115 to relay the CLI indication 220-*a*). For example, the first base station 105-*a* may transmit control signaling to the UEs 115 (e.g., first UE 115-*a*) which indicates that the UEs 115 are to relay the CLI indication 220-*a* if the respective UEs 115 receive downlink signals from the first base station 105-*a*, the second base station 105-*b*, or both, with reference signal received power (RSRP) values which exceed some threshold. In other words, UEs 115 may be configured to relay the CLI indication 220-*a* if a first RSRP ($RSRP_1$) associated with signals received from the first base station 105-*a* satisfies (e.g., is greater than or equal to) a threshold ($RSRP_{Thresh}$), and/or if a second RSRP ($RSRP_2$) associated with signals received from the second base station 105-*b* satisfies the threshold ($RSRP_{Thresh}$) In other words, UEs 115 may be configured to relay the CLI indication 220-*a* if $RSRP_1 > RSRP_{Thresh}$, and/or if $RSRP_2 > RSRP_{Thresh}$.

In some cases, the first UE 115-*a* may be configured to monitor SSBs and other signals from the first base station 105-*a* and the second base station 105-*b* in order to determine signal strengths (e.g., RSRPs) of signals received from the respective base stations 105 in order to evaluate satisfaction (or lack thereof) of the trigger condition(s) for relaying the CLI indication 220-*a*. Configuring UEs 115 to relay the CLI indication 220-*a* in cases where the UEs 115 exhibit sufficient signal strength from both the victim and aggressor base stations 105 may improve a likelihood that the respective UEs 115 will be able to successfully receive the CLI indication 220-*a* from the victim base station 105-*a* as well as successfully relay/forward the CLI indication 220-*b* to the aggressor base station 105-*b*.

In some implementations, UEs 115 may be configured with multiple relay selection criteria or trigger conditions for relaying the CLI indication 220-*a* (e.g., "secondary" relay selection criterion or trigger conditions). For example, a serving base station 105 (e.g., victim base station 105-*a*, aggressor base station 105-*b*) may transmit control signaling which configures UEs 115 to relay the CLI indication if a first signal strength ($RSRP_1$) associated with signals received from the first base station is less than some threshold ($RSRP_{Thresh}$), and/or if a second signal strength ($RSRP_2$) associated with signals received from the second base station 105-*b* is less than some threshold ($RSRP_{Thresh}$). In other words, UEs 115 may be configured to relay the CLI indication 220-*a* if $RSRP_1 < RSRP_{Thresh}$, and/or if $RSRP_2 < RSRP_{Thresh}$. Configuring UEs 115 to relay the CLI indication 220-*a* if a signal strength associated with signals received from the first base station 105-*a* may ensure that the respective UEs 115 are sufficiently far from the first base station 105-*a*, which may improve a likelihood that the respective UEs 115 are closer to the second base station 105-*b*, and therefore able to successfully relay the CLI indication 220-*a*.

Upon receiving a message including the CLI indication 220-*a*, UEs 115 may be configured to evaluate a relative priority between relaying/forwarding the CLI indication 220-*a* and other traffic at the respective UEs 115 (e.g., uplink traffic, sidelink traffic). For example, upon receiving the CLI indication 220-*a*, the first UE 115-*a* may be configured to evaluate whether it is to prioritize relaying of the CLI indication 220-*a* over its own uplink/sidelink traffic, or vice versa.

In some aspects, UEs 115 may be configured (e.g., via signaling from the network, pre-configured) with one or more priority rules for determining whether to drop scheduled uplink/sidelink traffic, or whether to drop (e.g., refrain from relaying) the CLI indication 220-*a*. In accordance with a first priority rule, a relay UE 115 may be configured to prioritize its own scheduled traffic (e.g., scheduled uplink/sidelink traffic), and may therefore be configured to drop the CLI indication 220-*a*. In other words, in accordance with the first priority rule, the first UE 115-*a* may prioritize its own traffic, and therefore refrain from relaying/forwarding the CLI indication 220-*a*. Comparatively, in accordance with a second priority rule, a relay UE 115 may be configured to prioritize relaying the CLI indication 220-*a*, and may therefore be configured to drop its own uplink/sidelink traffic. In other words, in accordance with the second priority rule, the first UE 115-*a* may relay/forward the CLI indication 220-*a* (e.g., transmit CLI indication 220-*b*), and may drop its own uplink/sidelink traffic in order to accommodate relay of the CLI indication 220-*a*.

In accordance with a third priority rule, relay UEs 115 may be configured to compare a relative priority of the CLI indication 220-*a* with a priority of its own scheduled traffic. In other words, if a priority of a scheduled uplink/sidelink message is high, the first UE 115-*a* may be configured to prioritize transmission of the uplink/sidelink message over relay of the CLI indication 220-*a*. Comparatively, if a priority of a scheduled uplink/sidelink message is low, the first UE 115-*a* may be configured to prioritize relay of the CLI indication 220-*a* over transmission of the uplink/sidelink message.

In some aspects, a power control parameters (e.g., transmit power) used by a relay UE 115 (e.g., first UE 115-*a*) to transmit/relay/forward a CLI indication 220-*b* to the second base station 105-*b* may be determined/configured based on power control parameters of the second base station 105-*b*. Configuring a transmit power of CLI indications 220 relayed to the aggressor base station 105-*b* may improve a likelihood that the relayed CLI indication 220 (e.g., CLI indication 220-*b*) may successfully reach the aggressor base station 105-*b*. Power control parameters of the second base station 105-*b* which may be used to determine/configure transmit power for the CLI indication 220-*b* may include, but are not limited to, a transmit power value (P0), an alpha value (α), a closed loop index, a path loss reference signal (PL RS), or any combination thereof.

In some aspects, power control parameters for relaying CLI indications 220 to the aggressor base station 105-*b* may be pre-configured at the relay UEs 115, signaled by a serving base station 105 (e.g., first or second base station 105), or both. For example, the first base station 105-*a* and/or the second base station 105-*b* may configure the first UE 115-*a* with a set of power control parameters for relaying the CLI indication 220-*b* via dedicated RRC signaling, broadcast signals, or both. In some cases, the first base station 105-*a* may determine power control parameters of the second base station 105-*b* (which are used to indicate power control parameters for the first UE 115-*a*) based on backhaul coordination between the first base station 105-*a* and the second base station 105-*b*.

In some implementations, the serving base station 105 for a relay UE 115 (e.g., first base station 105-*a*, second base station 105-*b*) may indicate or specify beam information to the first UE 115-*a* for receiving the CLI indication 220-*a* and/or transmitting the CLI indication 220-*b*. For example, in some implementations, the first base station 105-*a* and/or the second base station 105-*b* may configure Tx/Rx beams for the first UE 115-*a* for transmitting/receiving the CLI indication 220. For instance, in some cases, the first base station 105-*a* may configure the receive beam and/or a set of resources (e.g., time/frequency resources) at the first UE 115-*a* for receiving the message including the CLI indication 220-*a*. In some cases, configuring the receive beam at the first UE 115-*a* may be performed via a beam management procedure between the first UE 115-*a* and the first base station 105-*a*, via an SSB message received from the first base station 105-*a*, or both.

Similarly, by way of another example, the second base station 105-*b* may configure the transmit beam and/or a set of resources (e.g., time/frequency resources) at the first UE 115-*a* for transmitting/relaying a message including the CLI indication 220-*b*. In some cases, configuring the transmit beam at the first UE 115-*a* may be performed via a beam management procedure between the first UE 115-*a* and the second base station 105-*b*, via an SSB message received from the second base station 105-*b*, or both. In some aspects, the Tx/Rx beams used by the first UE 115-*a* to relay the CLI indication may be determined by the serving base station 105 via measurements and/or reports associated with beams at the aggressor base station 105-*b*, such as neighbor cell measurements.

In additional or alternative cases, the transmit and receive beams used by the first UE 115-*a* to relay the CLI indication 220 between the base stations 105 may be left up to UE 115 implementation. In other words, the receive and/or transmit beams used by the UE 115-*a* to receive/transmit the CLI indication 220-*a*, 220-*b* may be selected by the first UE 115-*a*. In some cases, the first UE 115-*a* may select transmit/receive beams based on beam management procedures performed with the respective base stations 105, based on beams for receiving SSB messages from the respective base stations 105, or both. In this regard, beam selection at a relay UE 115 may be performed similar to initial access procedures performed by the relay UEs 115 for SSB beam identification per cell. Moreover, in some aspects, resources (e.g., time/frequency resources) for receiving the CLI indication 220-*a*, transmitting the CLI indication 220-*b*, or both, may be configured by the respective base stations 105. For example, in some cases, the first base station 105-*a* may schedule a downlink message for the CLI indication 220-*a*. Similarly, in some cases, the second base station 105-*b* may grant or allocate resources for transmitting the CLI indication 220-*b*, such as in response to a scheduling request received from the first UE 115-*a*.

In some aspects, the message including the CLI indication 220-*b* may include information which may enable the aggressor base station 105-*b* to adjust one or more communications parameters in order to reduce or eliminate CLI at the victim base station 105-*a*. Information which may be included along with the CLI indication 220-*b* may include identifiers associated with the victim base station 105-*a* and/or the aggressor base station 105-*b*, CLI measurements performed by the victim base station 105-*a*, requests or instructions for the aggressor base station 105-*b* to adjust one or more communications parameters in order to reduce or eliminate CLI at the victim base station 105-*a*, or any combination thereof. That is, the victim base station 105-*a* may instruct relay UEs 115 to relay indications of requests or instructions for the aggressor base station 105-*b* to adjust one or more communications parameters.

Communications parameters of the aggressor base station 105-*b* which may be selectively adjusted in response to the CLI indication 220-*b* may include power control parameters at the aggressor base station 105-*b* (e.g., transmit power), resources used for downlink transmissions (e.g., time/frequency/spatial resources), indications of transmit beams at the aggressor base station 105-*b* which cause the CLI, or any combination thereof. Accordingly, in some aspects, the aggressor base station 105-*b* may be configured to selectively adjust one or more communications parameters in response to the CLI indication 220-*b* in order to reduce or eliminate CLI 205 experienced at the victim base station 105-*a*.

The foregoing description of FIG. 2 has been limited to the case in which the first UE 115-*a* is in coverage of both the victim and aggressor base stations 105, and is therefore able to relay the CLI indication 220 directly to the aggressor base station 105-*b*. However, in some cases, the first UE 115-*a* may only be within coverage of the victim base station 105-*a*, and may therefore be unable to transmit the CLI indication 220-*b* directly to the aggressor base station 105-*b*. Moreover, in some cases, there may not be any UEs 115 which are in coverage of both the victim and aggressor base stations 105. In such cases, techniques described herein may enable the use of a "multi-hop" relay in order to relay CLI indications 220 between the victim base station 105-*a* and the aggressor base station 105-*b*. In other words, techniques described herein may enable the use of multiple relay UEs 115 to relay CLI indications 220 between the victim base station 105-*a* and the aggressor base station 105-*b*.

For example, upon receiving the CLI indication 220-*a*, the first UE 115-*a* may determine that it is unable to directly communicate with the aggressor base station 105-*b*, such as based on an indication of the aggressor base station 105-*b* included with the CLI indication 220-*a*. In this regard, the first UE 115-*a* may search or probe for other neighboring relay UEs 115 which may be used to relay the CLI indication 220-*a* to the aggressor base station 105-*b*. In particular, the first UE 115-*a* may search for neighbor relay UEs 115 which are served by the aggressor base station 105-*b*.

Several techniques or implementations may be used by the first UE 115-*a* to search for other relay UEs 115 which may be used to form a multi-hop relay to relay CLI indications 220 to the aggressor base station 105-*b*. In some cases, the first UE 115-*a* may identify neighboring UEs 115 based on sidelink messages received from other UEs 115, such as sidelink control information (SCI) messages, sidelink SSB messages, discovery messages, and the like. In some aspects, sidelink messages received from other UEs 115 may include identifiers (e.g., cell identifiers) of serving base stations 105 which serve the respective UEs 115. In other words, sidelink messages received from other neighboring UEs 115 may include a list of reachable cell IDs, which may be used by the first UE 115-a to identify other relay UEs 115 which are served by the aggressor base station 105-b. Cell/base station identifiers included within sidelink messages received from other UEs 115 may be based on self measurements performed by the neighboring UEs 115 on SSBs received from neighbor cell/base station 105 for mobility and/or handover purposes.

In some cases, the first UE 115-a may transmit (e.g., unicast, broadcast) a request for other UEs 115 which are able/willing to relay the CLI indication 220 and which are able to communicate with the aggressor base station 105-b, and may receive feedback messages (e.g., ACK/NACK) from neighboring UEs 115 which are or are not able/willing to relay the CLI indication 220.

In some aspects, the first UE 115-a may identify multiple candidate relay UEs 115 which may be used to relay the CLI indication 220-a to the aggressor base station 105-b. In such cases, the first UE 115-a may be configured to select a relay UE 115 from the set of multiple candidate relay UEs 115 based on one or more parameters, including a geographical location of the respective relay UEs 115, signal strengths between the first UE 115-a and the respective relay UEs 115, signal strengths between the aggressor base station 105-b and the respective relay UEs 115, or any combination thereof. For example, as shown in FIG. 2, the first UE 115-a may select the second UE 115-b to assist with relaying the CLI indication 220-a to the aggressor base station 105-b.

Upon identifying the second UE 115-b which will be used to relay the CLI indication 220-a to the aggressor base station 105-b, the first UE 115-a may transmit a request to the second UE 115-b via a sidelink message. In some cases, the first UE 115-a and the second UE 115-b may utilize the same transmit and receive beams, respectively, which are used for sidelink communications between the respective UEs 115-a, 115-b in order to communicate the request. In this regard, the transmit/sidelink beams used for communicating requests and CLI indications 220-c between the UEs 115-a, 115-b may be determined/selected based on a sidelink beam management procedure performed between the respective UEs 115-a, 115-b. The default forwarding base station 105 for the second UE 115-b may include the serving base station 105 of the second UE 115-b. Additionally, or alternatively, the first UE 115-a may transmit request which includes an identifier associated with the aggressor base station 105-b.

Continuing with the same example, the second UE 115-b may receive the request to relay the CLI indication 220-a from the first UE 115-a, and may transmit feedback/response signaling (e.g., ACK/NACK) which indicates that the second UE 115-b is able/willing to relay the CLI indication 220-a. In such cases, the first UE 115-a may generate a sidelink message including a CLI indication 220-c, and may transmit the sidelink message/CLI indication 220-c to the second UE 115-b.

In some cases, the victim base station 105-a may configure/signal resources and/or beam information for communicating the message including the CLI indication 220-c from the first UE 115-a to the second UE 115-b. In other words, the victim base station 105-a may configure the receive and transmit beam for receiving/transmitting the CLI indications 220-a, 220-c at the first UE 115-a. As noted previously herein, the receive beam used by the first UE 115-a for receiving the CLI indication 220-a may be determined via a beam management procedure between the first UE 115-a and the victim base station 105-a. For example, the victim base station 105-a may configure the receive beam and resources for receiving the CLI indication 220-a based on an SSB message transmitted by the victim base station 105-a.

Moreover, in some cases, the victim base station 105-a may configure a transmit beam and/or resources for transmitting the CLI indication 220-c from the first UE 115-a to the second UE 115-b. In some cases, the first UE 115-a and the second UE 115-b may use the same sidelink beams which are used for sidelink communications for transmitting and receiving the CLI indication 220-c. In this regard, sidelink beams used for transmitting/receiving the CLI indication 220-c may be determined based on a sidelink beam management procedure (e.g., sidelink beam management report) performed between the respective UEs 115-a, 115-b.

Additionally, or alternatively, in cases where the second UE 115-b is within coverage of the victim base station 105-a, the victim base station 105-a may configure beam and resource information for receiving the CLI indication 220-c at the second UE 115-b (e.g., via signaling from the victim base station 105-a to the second UE 115-b). Comparatively, in cases where the second UE 115-b is out of coverage of the victim base station 105-a, the aggressor base station 105-b may configure beam and resource information for receiving the CLI indication 220-c at the second UE 115-b (e.g., via signaling from the aggressor base station 105-b to the second UE 115-b). In additional or alternative cases, the transmit and receive beams used by the first and second UEs 115-a, 115-b to relay the CLI indication 220-c between the respective UEs 115 may be left up to UE 115 implementation. In other words, the receive and/or transmit beams used by the first UE 115-a and the second UE 115-b to transmit and receive the CLI indication 220-b may be selected by the respective UEs 115.

Beam information, resources, power control parameters, and other parameters for communicating a CLI indication 220-d from the second UE 115-b to the aggressor base station 105-b may be determined/configured in a number of ways. For example, as described previously herein, power control parameters for transmitting a message including the CLI indication 220-d from the second UE 115-b to the aggressor base station 105-b may be configured by the aggressor base station 105-b, the victim base station 105-a, or both.

In some aspects, in cases where the second UE 115-b is in a connected mode of operation, the second UE 115-b may use its current active beam to send a scheduling request (e.g., via physical uplink control channel (PUCCH) resources) to the aggressor base station 105-b. In such cases, the aggressor base station 105-b may transmit a grant indicating resources for the CLI indication 220-d in response to the request. Once the uplink resource for the CLI indication 220-d is granted, the second UE 115-d may relay/forward a message including the CLI indication 220-d to the aggressor base station 105-b within the indicated uplink resources. In this regard, the aggressor base station 105-b may signal/configure beam and/or resource information used for the CLI indication 220-d within the grant for the second UE 115-b.

Comparatively, in cases where the second UE 115-b is in an idle mode of operation, the second UE 115-b may transmit the CLI indication 220-d as part of a random access channel (RACH) procedure performed between the second UE 115-b and the aggressor base station 105-b. For example, while in an idle mode of operation, the second UE 115-*b* may initiate RACH preamble transmission. In this example, upon initiating the RACH preamble, the second UE 115-*b* may transmit a buffer status report via Msg3 (e.g., MAC-CE) of the RACH procedure to request a grant from the aggressor base station 105-*b* to relay the CLI indication 220-*d*. Subsequently, the aggressor base station 105-*b* may configure beam and/or resource information in an uplink grant, and the second UE 115-*b* may relay the CLI indication 220-*d* within resources granted by the aggressor base station 105-*b*. Additionally, or alternatively, upon initiating the RACH preamble, the second UE 115-*b* may transmit the CLI indication 220-*d* via Msg3 (e.g., MAC-CE) of the RACH procedure. In such cases, Msg3 may include dedicated bit fields for CLI indications 220, and may be transmitted via a RACH beam of the second UE 115-*b*.

As noted previously herein, the message including the CLI indication 220-*d* relayed by the second UE 115-*b* may include information which may enable the aggressor base station 105-*b* to adjust one or more communications parameters in order to reduce or eliminate CLI at the victim base station 105-*a*, such as identifiers associated with the victim base station 105-*a* and/or the aggressor base station 105-*b*, CLI measurements performed by the victim base station 105-*a*, requests or instructions for the aggressor base station 105-*b* to adjust one or more communications parameters in order to reduce or eliminate CLI at the victim base station 105-*a*, or any combination thereof. Accordingly, in some aspects, the aggressor base station 105-*b* may be configured to selectively adjust one or more communications parameters in response to the CLI indication 220-*d* in order to reduce or eliminate CLI 205 experienced at the victim base station 105-*a*.

Techniques described herein may facilitate the communication of CLI indications 220 between the victim base station 105-*a* and the aggressor base station 105-*b*, which may inter-gNB CLI experienced within the wireless communications system 200. In particular, by enabling CLI indications 220 to be communicated between base stations 105 using relay UEs 115, techniques described herein may increase the effective communication range of the victim base station 105-*a* for communicating CLI indications 220, which may lead to decreased inter-gNB CLI 205, reduced noise, and higher reliability within the wireless communications system 200. Moreover, by reducing CLI 205 experienced at the victim base station 105-*a*, techniques described herein may enable the victim base station 105-*a* to effectively reduce a transmit power used to perform wireless communications as compared to the transmit power used in the presence of inter-gNB CLI 205, thereby reducing power consumption within the wireless communications system 200.

Figure 3:
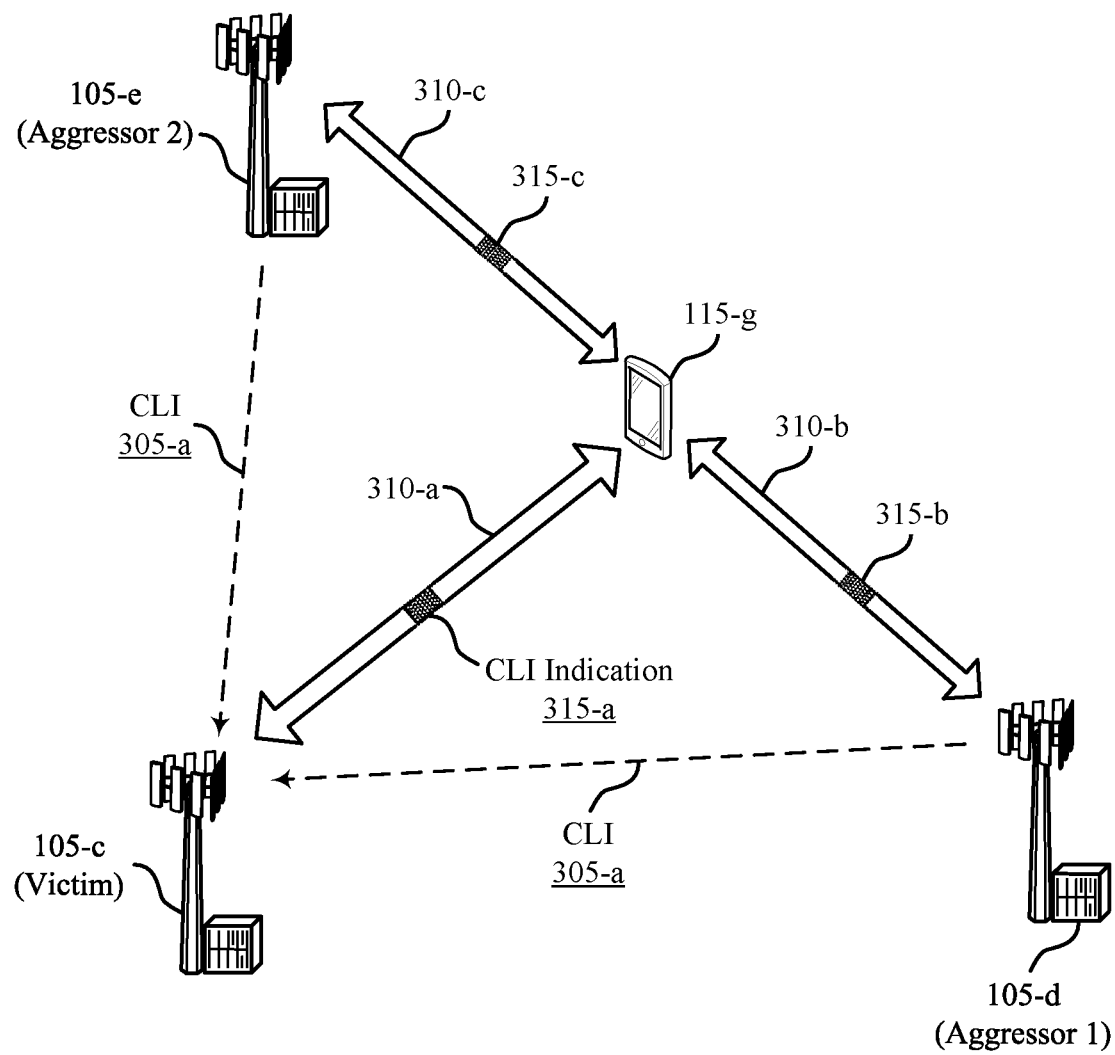
FIG. 3 illustrates an example of a wireless communications system that supports techniques for inter-base station messaging for inter-base station CLI mitigation in accordance with aspects of the present disclosure.

FIG. 3 illustrates an example of a wireless communications system 300 that supports techniques for inter-base station messaging for inter-base station CLI mitigation in accordance with aspects of the present disclosure. In some examples, wireless communications system 300 may implement, or be implemented by, aspects of wireless communications system 100, wireless communications system 200, or both. The wireless communications system 300 may include a first base station 105-*c* (e.g., victim base station 105-*c*), a second base station 105-*d* (e.g., aggressor base station 105-*d*), a third base station 105-*e* (e.g., aggressor base station 105-*e*), and a relay UE 115-*g*, which may be examples of base stations 105 and UEs 115 described with reference to FIGS. 1 and 2.

As noted previously herein with respect to FIG. 2, the relay UE 115-*g* illustrated in FIG. 3 may be configured to relay CLI indications 315 from the victim base station 105-*c* to the aggressor base stations 105-*d*, 105-*e*. In particular, the relay UE 115-*g* of the wireless communications system 300 may be within coverage of each of the respective base stations 105-*c*, 105-*d*, 105-*e*, such that the relay UE 115-*g* is able to relay CLI indications 315 directly from the victim base station 105-*c* to the respective aggressor base stations 105-*d*, 105-*e* (e.g., without additional relay UEs 115).

In some aspects, the victim base station 105-*c* may determine that CLI experienced at the victim base station 105-*c* satisfies some threshold interference level, and may therefore detect a high CLI condition at the victim base station 105-*c*. Upon detecting the high CLI condition, the victim base station 105-*c* may transmit a message including a CLI indication 315-*a* to the relay UE 115-*g*. In some cases, if the aggressor base station 105 associated with the high CLI condition is identified, the relay UE 115-*g* may be configured to relay a CLI indication 315 only to the indicated aggressor base station 105-*b*. For example, the victim base station 105-*c* may detect a high CLI condition caused by the aggressor base station 105-*d*, and may include an indication of the aggressor base station 105-*d* within the message including the CLI indication 315-*a*. In this example, the relay UE 115-*g* may be configured to relay a CLI indication 315-*b* to the aggressor base station 105-*d* based on the indication of the aggressor base station 105-*d*, and may refrain from relaying a CLI indication 315-*c* to the aggressor base station 105-*e*.

This differentiation between aggressor base stations 105 may be used if the resource for the relayed message is different for the different aggressor base stations 105. Moreover, by enabling the relay UE 115-*g* to relay CLI indications 315 which are specific to each respective aggressor base station 105, techniques described herein may enable the victim base station 105-*c* to tailor requests/instructions for the respective base stations 105 to adjust transmission parameters in order to more effectively reduce CLI at the victim base station 105. In other words, by enabling the relay UE 115-*g* to relay CLI indications 315 which are specific to each respective aggressor base station 105, the victim base station 105-*a* may transmit (via the relay UE 115-*g*) different sets of parameters or requests to the respective aggressor base stations 105 in order to more efficiently reduce CLI at the victim base station 105-*c*.

Comparatively, in cases where the aggressor base station 105 which is causing the high CLI condition is not indicated, the relay UE 115-*g* may be configured to relay a CLI indication 315 to each serving base station 105 that serves the relay UE 115-*g*. For example, the relay UE 115-*g* may receive a message including the CLI indication 315-*a*, where the message does not specify which aggressor base station 105 is causing the high CLI condition at the victim base station 105-*c*. In this example, due to the fact that the relay UE 115-*g* does not know which base station 105 is the aggressor (e.g., due to the absence of a base station 105 identifier), the relay UE 115-*g* may be configured to relay a CLI indication 315-*b* and a CLI indication 315-*c* to the aggressor base station 105-*d* and the aggressor base station 105-*e*, respectively.

In some aspects, inter-gNB messages including CLI indications 315 which are relayed/forwarded by the relay UE 115-*g* may be transmitted via time division multiplexing techniques (e.g., "TDMed"). In other words, the relay UE 105-*g* may transmit the CLI indications 315-*b* and 315-*c* to the respective aggressor base stations 105-*d*, 105-*e* within different TTIs. Additionally, or alternatively, if the relay UE 115-*g* has simultaneous transmission. capability, inter-gNB messages including CLI indications 315 which are relayed/forwarded by the relay UE 105-*g* may be transmitted via space division multiplexing techniques (e.g., "SDMed"). In other words, the relay UE 105-*g* may transmit the CLI indications 315-*b* and 315-*c* to the respective aggressor base stations 105-*d*, 105-*e* using different transmit beams which are associated with different spatial orientations. Further, in some cases, different inter-gNB messages including CLI indications 315 may be relayed/forwarded to the respective aggressor base stations 105-*d*, 105-*e* using different relay UEs 115.

As noted previously herein, parameters for receiving and transmitting messages including CLI indications 315 at the relay UE 115, such as transmit/receive beams, time/frequency resources, and power control parameters, may be configured or signaled by the victim base station 105-*c*, the aggressor base stations 105-*d*, 105-*e*, or any combination thereof. In other words, a serving base station 105 may specify beam information, resources, and power control parameters for the relay UE 115-*g* for the TDMed and/or SDMed resources used to relay the CLI indications 315 between the victim base station 105-*c* and the respective aggressor base stations 105-*d*, 105-*e*.

Figure 4:
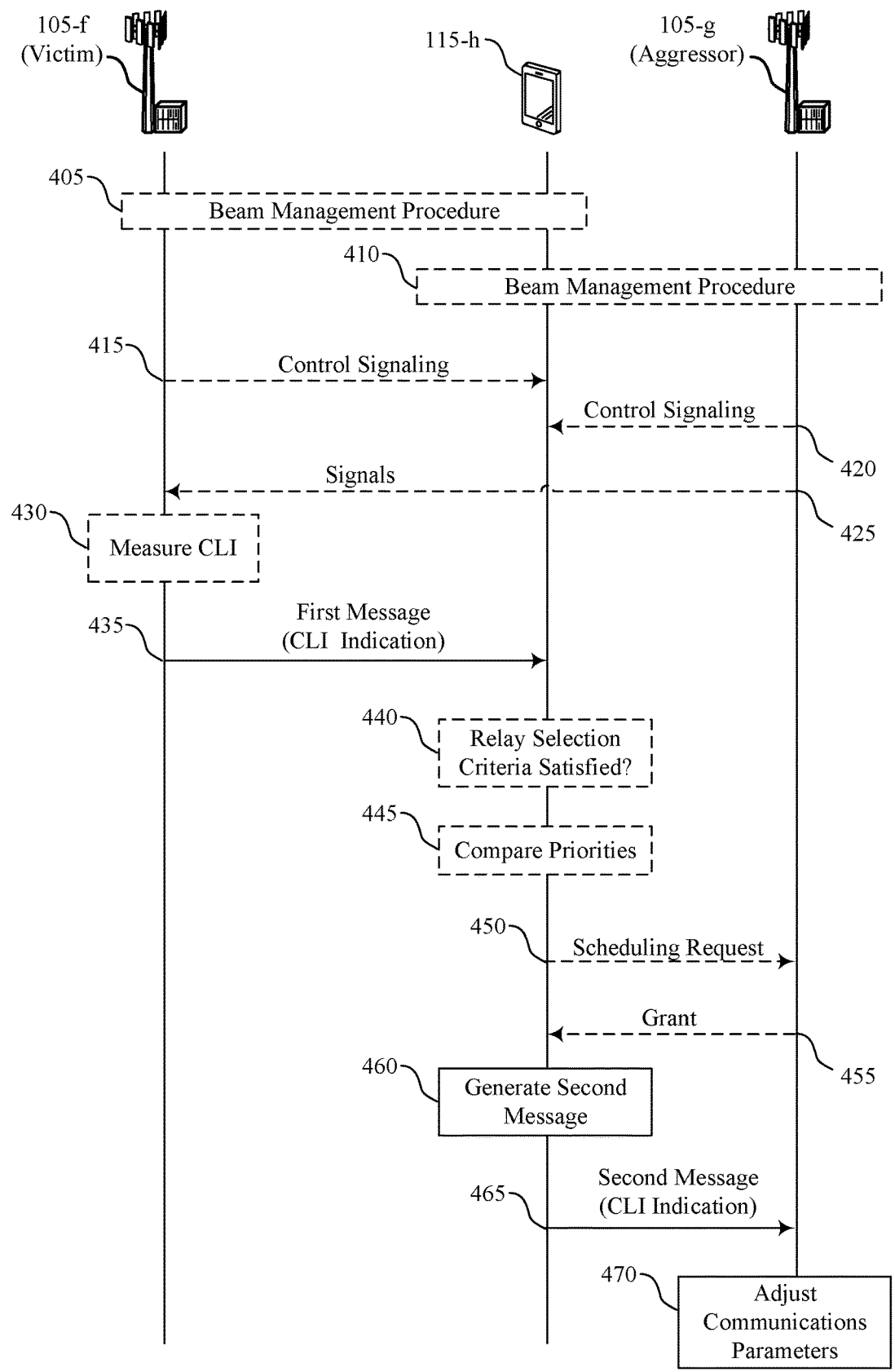
FIG. 4 illustrates an example of a process flow that supports techniques for inter-base station messaging for inter-base station CLI mitigation in accordance with aspects of the present disclosure.

FIG. 4 illustrates an example of a process flow 400 that supports techniques for inter-base station messaging for inter-base station CLI mitigation in accordance with aspects of the present disclosure. In some examples, process flow 300 may implement, or be implemented by, aspects of wireless communications system 100, wireless communications system 200, wireless communications system 300, or any combination thereof. In particular, the process flow 400 illustrates configurations and signaling which enables a single relay UE 115-*h* to relay CLI indications between a victim base station 105-*f* and an aggressor base station 105-*g*, as described as described with reference to FIGS. 1-3, among other aspects.

The process flow 400 may include a relay UE 115-*h*, a first base station 105-*f* (e.g., victim base station 105-*f*), and a second base station 105-*g* (e.g., aggressor base station 105-*g*), which may be examples of UEs 115 and base stations 105 as described with reference to FIGS. 1-3. For example, the relay UE 115-*g* illustrated in FIG. 4 may include an example of the first UE 115-*a* and the UE 115-*g* as illustrated in FIGS. 2 and 3, respectively. Similarly, the victim base station 105-*f* and the aggressor base station 105-*g* illustrated in FIG. 4 may include examples of the victim base station 105-*a* and the aggressor base station 105-*b*, respectively, as illustrated in FIG. 2.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the relay UE 115-*h* may perform a beam management procedure with the victim base station 105-*f*. Similarly, at 410, the relay UE 115-*h* may perform a beam management procedure with the aggressor base station 105-*b*. In some aspects, as noted previously herein, beam management procedures performed with the respective base stations 105 may be performed in order to identify receive/transmit beams which will be used to communicate CLI indications between the respective base stations 105. For example, the relay UE 115-*h* may receive an SSB message from the victim base station 105-*f* at 405, and may receive an SSB message from the aggressor base station 105-*g* at 410. In this example, the received SSB messages may be used to determine Tx/Rx beams which will be used to relay CLI indications.

At 415, the relay UE 115-*h* may receive control signaling from the victim base station 105-*f*. Similarly, at 420, the relay UE 115-*h* may receive control signaling from the aggressor base station 105-*g*. The control signaling at 415 and 420 may include any control signaling, including RRC signaling, DCI messaging, MAC-CE messaging, SSB messaging, or any combination thereof. In some cases, the relay UE 115-*h* may receive the control signaling at 415 and 410 based on the performance of the beam management procedures performed at 405 and 410, respectively (e.g., using receive beams determined in accordance with the beam management procedures).

In some aspects, the control signaling at 415 and 420 may include information which may be used by the relay UE 115-*h* to relay CLI indications between the victim base station 105-*f* and the aggressor base station 105-*g*. Information used for relaying CLI indications may include resources for relaying CLI indications, relay selection criteria for relaying CLI indications, priority configuration(s) for relaying CLI indications, power control parameters for relaying CLI indications, beam information for relaying CLI indications, or any combination thereof.

For example, in some cases, the relay UE 115-*g* may receive, via the control signaling at 415 and/or 420, an indication of one or more relay selection criteria for relaying CLI indications. In this regard, the victim base station 105-*f* and/or the aggressor base station 105-*g* may configure the relay UE 115-*g* with constraints/relay selection criteria which, if satisfied, trigger the relay UE 115-*h* to relay CLI indications. Relay selection criteria for relaying CLI indications may be based on any number of parameters, including a location of the relay UE 115-*h*, signal strength(s) associated with signals received at the relay UE 115-*h* from the victim base station 105-*f* and/or aggressor base station 105-*g*, and the like.

By way of another example, the control signaling at 415 and/or 420 may indicate one or more priority configurations associated with determining a relative priority between CLI indications and other traffic scheduled at the relay UE 115-*h*. In other words, the UE 115-*h* may be configured with one or more priority configurations for determining whether the relay UE 115-*h* is to prioritize scheduled uplink/sidelink traffic at the relay UE 115-*h* over relay of CLI indications, or vice versa. Moreover, in some cases, the control signaling at 415 and/or 420 may indicate a set of power control parameters associated with communications performed at/with the aggressor base station 105-*g*. In other words, the control signaling may indicate power control parameters which are to be used to transmit/relay CLI indications to the aggressor base station 105-*g*. Power control parameters may include, but are not limited to, a transmit power value (P0), an alpha value ($\alpha$), a closed loop index, a PL RS, or any combination thereof.

At 425, the victim base station 105-*f* may receive signals transmitted by the aggressor base station 105-*g*. For example, the victim base station 105-*f* may receive downlink signals transmitted by the aggressor base station 105-*g* which are intended for one or more UEs 115 served by the aggressor base station 105-*g*.

At 430, the victim base station 105-*f* may measure CLI which is caused by (e.g., attributable to) the signals received from the aggressor base station 105-*g* at 425 (e.g., measure inter-gNB CLI). In other words, the victim base station 105-*f* may measure interference of uplink signals received at the victim base station 105-*f* which is attributable to downlink signals transmitted by the aggressor base station 105-*g*. In some aspects, the victim base station 105-*f* may compare measured CLI to one or more interference thresholds in order to identify a presence (or lack thereof) of a high-CLI condition at the victim base station 105-*f*. In cases where the measured CLI satisfies an interference threshold (e.g., high-CLI condition is detected), the process flow 400 may proceed to 435.

At 435, the victim base station 105-*f* may transmit a first message to the relay UE 115-*g*, where the first message includes a CLI indication associated with the measured CLI experienced at the victim base station 105-*f*. The first message may include an RRC message, a DCI message, a MAC-CE message, an SSB message, or any combination thereof.

In some cases, the victim base station 105-*f* may transmit the first message based on detecting the high-CLI condition at 430 (e.g., based on measured CLI satisfying an interference threshold). As noted previously herein, the victim base station 105-*f* may indicate beam and/or resource information for the relay UE 115-*h* to receive the first message at 435. For example, in some cases, the relay UE 115-*h* may receive the first message based on a receive beam which was determined in accordance with the beam management procedure performed at 405. By way of another example, the victim base station 105-*f* may indicate a set of resources (e.g., time/frequency/spatial resources) for receiving the first message.

In some aspects, the first message may include information which may be used to help mitigate CLI experienced at the victim base station 105-*f*, including identifiers associated with the victim base station 105-*f* and/or the aggressor base station 105-*g*, an indication of the CLI measured at 430, requests/indications for the aggressor base station 105-*g* to adjust communications parameters to mitigate CLI, beam information (e.g., beam identifiers) of the aggressor base station 105-*g* which are associated (e.g., cause) the CLI, or any combination thereof.

At 440, the relay UE 115-*h* may determine whether a trigger condition for relaying the CLI indication. In particular, the relay UE 115-*h* may evaluate a satisfaction (or lack thereof) of one or more relay selection criteria for relaying the CLI indication which were configured via the control signaling at 415, the control signaling at 420, the first message at 435, or any combination thereof. As noted previously herein, a satisfaction of the one or more relay selection criteria may be based on any number of parameters or characteristics, including a location of the relay UE1 115-*h*, a first signal strength associated with signals received at the relay UE 115-*h* from the victim base station 105-*f* satisfying a threshold signal strength, a second signal strength associated with signals received at the relay UE 115-*h* from the aggressor base station 105-*g* satisfying a threshold signal strength, or any combination thereof.

At 445, the relay UE 115-*h* may compare a priority associated with the CLI indication with one or more priorities associated with additional traffic (e.g., uplink/sidelink traffic) which is scheduled to be transmitted by the relay UE 115-*h*. In other words, the relay UE 115-*h* may compare a priority of the CLI indication with additional priorities of additional traffic to be transmitted by the relay UE 115-*h* to determine whether the relay UE 115-*h* should drop the additional traffic in lieu of the CLI indication, or vice versa. In some aspects, the relay UE 115-*h* may perform the priority comparison at 445 in accordance with one or more priority configurations. Priority configurations may be configured (e.g., pre-configured) at the relay UE 115-*g*, signaled to the relay UE 115-*h* via the control signaling at 415 and/or 415, signaled to the relay UE 115-*h* via the first message at 435, or any combination thereof.

At 450, the relay UE 115-*h* may transmit a scheduling request to the aggressor base station 105-*g*, where the scheduling request includes a request for an uplink resource grant for relaying the CLI indication. In some aspects, the relay UE 115-*h* may transmit the scheduling request based on the performing the beam management configuration at 410, receiving the control signaling at 415 and/or 420, receiving the first message at 435, identifying a satisfaction of a trigger condition at 440, the priority comparison at 445, or any combination thereof. For example, the relay UE 115-*h* may transmit the scheduling request based on a transmit beam which was determined in accordance with the beam management procedure performed at 410. By way of another example, the relay UE 115-*h* may transmit the scheduling request based on a transmit beam which was determined in accordance with beam management information received via the control signaling at 415 and/or 420.

At 455, the relay UE 115-*h* may receive a grant from the aggressor base station 105-*g* based on (e.g., in response to) the scheduling request transmitted at 450. The grant may indicate a set of uplink resources for transmitting/relaying the CLI indication to the aggressor base station 105-*g*.

At 460, the relay UE 115-*h* may generate a second message which includes the CLI indication. The relay UE 115-*h* may generate the second message at 460 based on performing the beam management procedures at 405 and/or 410, receiving the control signaling at 415 and/or 420, receiving the first message at 435, identifying the satisfaction of a trigger condition at 440, the priority comparison at 445, receiving the grant at 455, or any combination thereof.

At 465, the relay UE 115-*h* may transmit (e.g., relay) the second message which includes the CLI indication to the aggressor base station 105-*g*. The relay UE 115-*h* may transmit the second message at 465 based on performing the beam management procedures at 405 and/or 410, receiving the control signaling at 415 and/or 420, receiving the first message at 435, identifying the satisfaction of a trigger condition at 440, the priority comparison at 445, receiving the grant at 455, generating the second control message at 460, or any combination thereof.

For example, the relay UE 115-*h* may transmit the second message within resources which were indicated/allocated via the grant at 455, the control signaling at 415 and/or 420, the first message at 435, or any combination thereof. By way of another example, the relay UE 115-*h* may transmit the second message using a transmit beam which was determined in accordance with the beam management procedure performed at 410. Additionally, or alternatively, the relay UE 115-*h* may transmit the second message using a transmit beam which was determined in accordance with beam management information received via the control signaling at 415 and/or 420. Further, in some aspects, the relay UE 115-*h* may transmit the second message in accordance with a set of power control parameters which were indicated via the control signaling at 415, the control signaling at 420, the first message at 435, or any combination thereof.

In some aspects, the second message may include information which may be used to help mitigate CLI experienced at the victim base station 105-*f*, including identifiers associated with the victim base station 105-*f* and/or the aggressor base station 105-*g*, an indication of the CLI measured at 430, requests/indications for the aggressor base station 105-*g* to adjust communications parameters to mitigate CLI, beam information (e.g., beam identifiers) of the aggressor base station 105-*g* which are associated (e.g., cause) the CLI, or any combination thereof.

At 470, the aggressor base station 105-*g* may selectively adjust or modify one or more communications parameters associated with communications at the aggressor base station 105-*g* based on receiving the second message including the CLI indication at 465. The aggressor base station 105-*h* may adjust communications parameters in order to reduce or eliminate CLI experienced at the victim base station 105-*f*. The aggressor base station 105-*g* may then be configured to perform communications (e.g., communicate with UEs 115 served by the aggressor base station 105-*g*) in accordance with the adjusted communications parameters.

In particular, the aggressor base station 105-*g* may selectively adjust communications parameters based on information received within the second message, including identifiers associated with the victim base station 105-*f* and/or the aggressor base station 105-*g*, an indication of the CLI measured at 430, requests/indications for the aggressor base station 105-*g* to adjust communications parameters to mitigate CLI, beam information (e.g., beam identifiers) of the aggressor base station 105-*g* which are associated (e.g., cause) the CLI, or any combination thereof. Communications parameters which may be selectively adjusted at the aggressor base station 105-*g* in order to reduce or eliminate CLI experienced at the victim base station 105-*f* may include, but are not limited to, a transmit beam used to transmit signals by the aggressor base station 105-*h*, a transmit power associated with signals transmitted by the aggressor base station 105-*h*, resource configurations including uplink and downlink resources used for communications at the aggressor base station 105-*h*, or any combination thereof.

Techniques described herein may facilitate the communication of CLI indications between the victim base station 105-*f* and the aggressor base station 105-*g*, which may inter-gNB CLI experienced within the wireless communications system. In particular, by enabling CLI indications to be communicated between the base stations 105 using the relay UE 115-*h*, techniques described herein may increase the effective communication range of the victim base station 105-*f* for communicating CLI indications, which may lead to decreased inter-gNB CLI, reduced noise, and higher reliability within the wireless communications system. Moreover, by reducing CLI experienced at the victim base station 105-*f*, techniques described herein may enable the victim base station 105-*f* to effectively reduce a transmit power used to perform wireless communications as compared to the transmit power used in the presence of inter-gNB CLI, thereby reducing power consumption within the wireless communications system.

Figure 5:
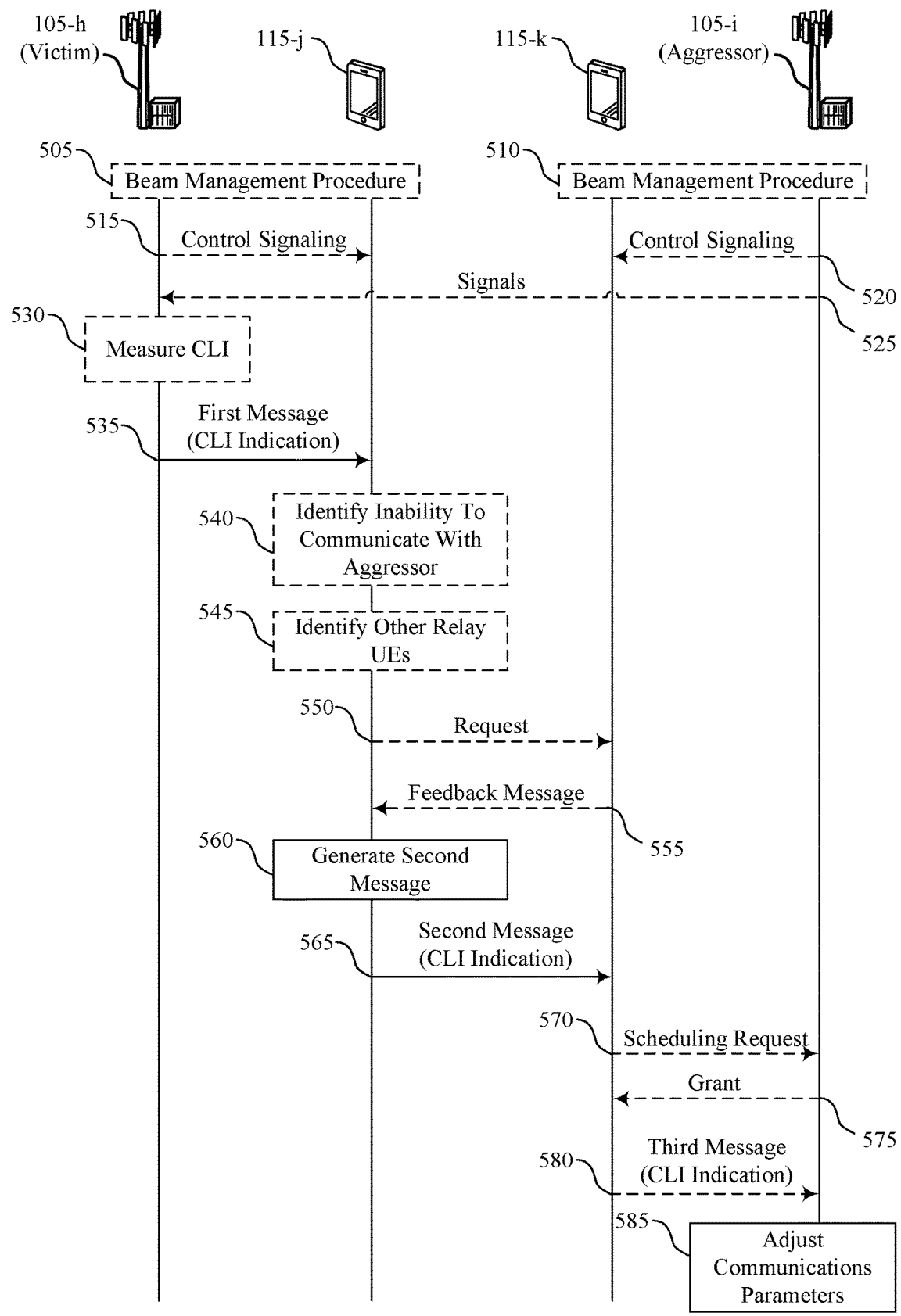
FIG. 5 illustrates an example of a process flow that supports techniques for inter-base station messaging for inter-base station CLI mitigation in accordance with aspects of the present disclosure.

FIG. 5 illustrates an example of a process flow 500 that supports techniques for inter-base station messaging for inter-base station CLI mitigation in accordance with aspects of the present disclosure. In some examples, process flow 500 may implement, or be implemented by, aspects of wireless communications system 100, wireless communications system 200, wireless communications system 300, process flow 400, or any combination thereof. In particular, the process flow 500 illustrates configurations and signaling which enables a multiple relay UEs 115-*j*, 115-*k* to relay CLI indications between a victim base station 105-*h* and an aggressor base station 105-*i*, as described as described with reference to FIGS. 1-3, among other aspects.

The process flow 500 may include a first relay UE 115-*j*, a second relay UE 115-*k*, a first base station 105-*h* (e.g., victim base station 105-*h*), and a second base station 105-*i* (e.g., aggressor base station 105-*i*), which may be examples of UEs 115 and base stations 105 as described with reference to FIGS. 1-4. For example, the first relay UE 115-*j* and the second relay UE 115-*k* illustrated in FIG. 5 may include examples of the first UE 115-*a* and the second UE 115-*b* as illustrated in FIG. 2. In this regard, the first relay UE 115-*j* may be within coverage of the victim base station 105-*h*, and the second relay UE 115-*k* may be within coverage of the aggressor base station 105-*i*. Similarly, the victim base station 105-*h* and the aggressor base station 105-*i* illustrated in FIG. 5 may include examples of the victim base station 105-*a* and the aggressor base station 105-*b*, respectively, as illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the first relay UE 115-*j* may perform a beam management procedure with the victim base station 105-*h*. Similarly, at 510, the second relay UE 115-*k* may perform a beam management procedure with the aggressor base station 105-*i*. In some aspects, as noted previously herein, beam management procedures performed with the respective base stations 105 may be performed in order to identify receive/transmit beams which will be used to communicate CLI indications between the respective base stations 105. For example, the first relay UE 115-*j* may receive an SSB message from the victim base station 105-*h* at 505, and the second relay UE 115-*k* may receive an SSB message from the aggressor base station 105-*i* at 505. In this example, the received SSB messages may be used to determine Tx/Rx beams at the respective relay UEs 115 which will be used to relay CLI indications.

At 515, the first relay UE 115-*j* may receive control signaling from the victim base station 105-*h*. Similarly, at 520, the second relay UE 115-*k* may receive control signaling from the aggressor base station 105-*i*. The control signaling at 515 and 520 may include any control signaling, including RRC signaling, DCI messaging, MAC-CE messaging, SSB messaging, or any combination thereof. In some cases, the respective relay UEs 115-*j*, 115-*k* may receive the control signaling at 515 and 510 based on the performance of the beam management procedures performed at 505 and 510, respectively (e.g., using receive beams determined in accordance with the beam management procedures).

In some aspects, the control signaling at 515 and 520 may include information which may be used by the respective relay UEs 115-*j*, 115-*k* to relay CLI indications between the victim base station 105-*h* and the aggressor base station 105-*i*. Information used for relaying CLI indications may include resources for relaying CLI indications, relay selection criteria for relaying CLI indications, priority configuration(s) for relaying CLI indications, power control parameters for relaying CLI indications, beam information for relaying CLI indications, or any combination thereof.

For example, in some cases, the first relay UE 115-*g*, the second relay UE 115-*k*, or both, may receive, via the control signaling at 515 and/or 520, an indication of one or more relay selection criteria for relaying CLI indications. In this regard, the victim base station 105-*h* and/or the aggressor base station 105-*i* may configure the relay UEs 115-*g*, 115-*k* with constraints/relay selection criteria (e.g., trigger conditions) which, if satisfied, trigger the relay UEs 115-*j* to relay CLI indications. Relay selection criteria for relaying CLI indications may be based on any number of parameters, including a location of the relay UE 115-*j*, signal strength(s) associated with signals received at the respective relay UEs 115 from the victim base station 105-*h* and/or aggressor base station 105-*i*, and the like.

By way of another example, the control signaling at 515 and/or 520 may indicate one or more priority configurations associated with determining a relative priority between CLI indications and other traffic scheduled at the respective relay UEs 115-*j*, 115-*k*. In other words, the relay UEs 115-*j*, 115-*k* may be configured with one or more priority configurations for determining whether the respective relay UEs 115 are to prioritize scheduled uplink/sidelink traffic at the respective relay UEs 115 over relay of CLI indications, or vice versa. Moreover, in some cases, the control signaling at 515 and/or 520 may indicate a set of power control parameters associated with communications performed at/with the second base station 105-*i*. In other words, the control signaling may indicate power control parameters which are to be used to transmit/relay CLI indications to the aggressor base station 105-*i*. Power control parameters may include, but are not limited to, a transmit power value (P0), an alpha value ($\alpha$), a closed loop index, a PL RS, or any combination thereof.

At 525, the victim base station 105-*h* may receive signals transmitted by the aggressor base station 105-*i*. For example, the victim base station 105-*h* may receive downlink signals transmitted by the aggressor base station 105-*i* which are intended for one or more UEs 115 served by the aggressor base station 105-*i*.

At 530, the victim base station 105-*h* may measure CLI which is caused by (e.g., attributable to) the signals received from the aggressor base station 105-*i* at 525 (e.g., measure inter-gNB CLI). In other words, the victim base station 105-*h* may measure interference of uplink signals received at the victim base station 105-*h* which is attributable to downlink signals transmitted by the aggressor base station 105-*i*. In some aspects, the victim base station 105-*h* may compare measured CLI to one or more interference thresholds in order to identify a presence (or lack thereof) of a high-CLI condition at the victim base station 105-*h*. In cases where the measured CLI satisfies an interference threshold (e.g., high-CLI condition is detected), the process flow 500 may proceed to 535.

At 535, the victim base station 105-*h* may transmit a first message to the first relay UE 115-*g*, where the first message includes a CLI indication associated with the measured CLI experienced at the victim base station 105-*h*. The first message may include an RRC message, a DCI message, a MAC-CE message, an SSB message, or any combination thereof.

In some cases, the victim base station 105-*h* may transmit the first message based on detecting the high-CLI condition at 530 (e.g., based on measured CLI satisfying an interference threshold). As noted previously herein, the victim base station 105-*h* may indicate beam and/or resource information for the first relay UE 115-*j* to receive the first message at 535. For example, in some cases, the first relay UE 115-*j* may receive the first message based on a receive beam which was determined in accordance with the beam management procedure performed at 505. By way of another example, the victim base station 105-*h* may indicate a set of resources (e.g., time/frequency/spatial resources) for receiving the first message.

In some aspects, the first message may include information which may be used to help mitigate CLI experienced at the victim base station 105-*h*, including identifiers associated with the victim base station 105-*h* and/or the aggressor base station 105-*i*, an indication of the CLI measured at 530, requests/indications for the aggressor base station 105-*i* to adjust communications parameters to mitigate CLI, beam information (e.g., beam identifiers) of the aggressor base station 105-*i* which are associated (e.g., cause) the CLI, or any combination thereof.

At 540, the first relay UE 115-*j* may identify that it is unable to communicate with the aggressor base station 105-*i*. In other words, the first relay UE 115-*j* may determine that it is not within coverage of (e.g., not served by) the aggressor base station 105-*i*. The first relay UE 115-*j* may identify that it is unable to communicate with the aggressor base station 105-*i* at 540 based on receiving the first message including the CLI indication at 535. For example, the first message may include an identifier associated with the aggressor base station 105-*i*, and the first relay UE 115-*j* may identify that the identifier is not included within a list of base stations 105 which serve the first relay UE 115-*j*.

At 545, the first relay UE 115-*j* may identify (e.g., search, probe) one or more other relay UEs 115 which may be used to relay the CLI indication to the aggressor base station 105-*i*. In particular, the first UE 115-*a* may search for neighbor relay UEs 115 which are served by the aggressor base station 105-*b* based on identifying that the first relay UE 115-*j* is unable to communicate with the aggressor base station 105-*i* at 540.

As noted previously herein, the first relay UE 115-*j* may be configured to identify other relay UEs 115 using any number of techniques or signaling, including. For example, the first relay UE 115-*j* may identify neighboring UEs 115 based on sidelink messages received from other UEs 115, such as SCI messages, sidelink SSB messages, discovery messages, and the like. As shown in FIG. 5, the first relay UE 115-*j* may identify the second relay UE 115-*k* as a candidate relay UE 115 which may be used to relay/forward the CLI indication to the aggressor base station 105-*i*.

At 550, the first relay UE 115-*j* may transmit a request to the second relay UE 115-*k*. In some cases, the first relay UE 115-*j* may transmit a request to a number of candidate relay UEs 115 in order to identify other UEs 115 which are able/willing to relay the CLI indication, and which are able to communicate with the aggressor base station 105-*i*.

At 555, the second relay UE 115-*k* may transmit a feedback message (e.g., ACK/NACK) in response to the request at 550. In some aspects, the feedback message may indicate that the second relay UE 115-*k* is able/willing to relay the CLI indication, an indication that the second relay UE 115-*k* is able to communicate with the aggressor base station 105-*i*, or both.

At 560, the first relay UE 115-*j* may generate a second message which includes the CLI indication. The relay UE 115-*j* may generate the second message at 560 based on performing the beam management procedures at 505 and/or 510, receiving the control signaling at 515 and/or 520, receiving the first message at 535, receiving the feedback message at 555, or any combination thereof.

At 565, the relay UE 115-*h* may transmit (e.g., relay) the second message which includes the CLI indication to the second relay UE 115-*k*. The first relay UE 115-*h* may transmit the second message at 565 based on performing the beam management procedures at 405 and/or 410, receiving the control signaling at 415 and/or 420, receiving the first message at 435, receiving the feedback message at 555, generating the second control message at 560, or any combination thereof.

In some aspects, the second message may include an indication for the second relay UE 115-*k* to relay the second message to the aggressor base station 105-*i*. In some aspects, the second message may include information which may be used to help mitigate CLI experienced at the victim base station 105-*h*, including identifiers associated with the victim base station 105-*h* and/or the aggressor base station 105-*i*, an indication of the CLI measured at 530, requests/indications for the aggressor base station 105-*i* to adjust communications parameters to mitigate CLI, beam information (e.g., beam identifiers) of the aggressor base station 105-*i* which are associated (e.g., cause) the CLI, or any combination thereof.

In some aspects, the communications between the first relay UE 115-*j* and the second relay UE 115-*k* may be performed using sidelink transmit and sidelink receive beams which are used for other sidelink communications between the respective UEs 115. For example, in some cases, the first relay UE 115-*j* and the second relay UE 115-*k* may perform a sidelink beam management procedure to identify transmit and receive beams which will be sued for the communications exchanged between the respective UEs 115.

At 570, the second relay UE 115-*k* may transmit a scheduling request to the aggressor base station 105-*i*, where the scheduling request includes a request for an uplink resource grant for relaying the CLI indication. In some aspects, the second relay UE 115-*k* may transmit the scheduling request based on the performing the beam management configuration at 510, receiving the control signaling at 515 and/or 520, receiving the second message at 565, or any combination thereof. For example, the second relay UE 115-*k* may transmit the scheduling request based on a transmit beam which was determined in accordance with the beam management procedure performed at 510. By way of another example, the second relay UE 115-*k* may transmit the scheduling request based on a transmit beam which was determined in accordance with beam management information received via the control signaling at 520.

At 575, the second relay UE 115-*k* may receive a grant from the aggressor base station 105-*i* based on (e.g., in response to) the scheduling request transmitted at 570. The grant may indicate a set of uplink resources for transmitting/relaying the CLI indication to the aggressor base station 105-*i*.

At 580, the second relay UE 115-*k* may transmit (e.g., relay) a third message which includes the CLI indication to the aggressor base station 105-*i*. The second relay UE 115-*k* may transmit the third message at 580 based on performing the beam management procedure at 510, receiving the control signaling at 520, receiving the second message at 565, or any combination thereof.

For example, the second relay UE 115-*k* may transmit the third message within resources which were indicated/allocated via the grant at 575, the control signaling at 520, or any combination thereof. By way of another example, the second relay UE 115-*k* may transmit the third message using a transmit beam which was determined in accordance with the beam management procedure performed at 510. Additionally, or alternatively, the second relay UE 115-*k* may transmit the third message using a transmit beam which was determined in accordance with beam management information received via the control signaling at 520. Further, in some aspects, the relay UE 115-*k* may transmit the third message in accordance with a set of power control parameters which were indicated via the control signaling at 520, the second message at 565, or any combination thereof.

As noted previously herein, in some aspects, the third message may include a random access message of a random access procedure. For example, in cases where the second UE 115-*b* is in a connected mode of operation, the second UE 115-*b* may use its current active beam to send a scheduling request (e.g., request at 570) to the aggressor base station 105-*b*. In this example, the aggressor base station 105-*i* may transmit a grant (e.g., grant at 575) indicating resources for the CLI indication in response to the request. Once the uplink resource for the CLI indication is granted, the second relay UE 115-*k* may relay/forward the third message including the CLI indication to the aggressor base station 105-*i* within the indicated uplink resources.

By way of another example, in cases where the second relay UE 115-*k* is in an idle mode of operation, the second relay UE 115-*k* may transmit the CLI indication as part of a RACH procedure performed between the second relay UE 115-*k* and the aggressor base station 105-*i*. For instance, while in an idle mode of operation, the second relay UE 115-*k* may initiate RACH preamble transmission. In this example, upon initiating the RACH preamble, the second relay UE 115-*k* may transmit a buffer status report via Msg3 (e.g., MAC-CE) of the RACH procedure to request a grant from the aggressor base station 105-*i* to relay the CLI indication (e.g., scheduling request at 570). Subsequently, the aggressor base station 105-*i* may configure beam and/or resource information in an uplink grant (e.g., grant at 575), and the second relay UE 115-*i* may relay the CLI indication within resources granted by the aggressor base station 105-*b*. Additionally, or alternatively, upon initiating the RACH preamble, the second relay UE 115-*i* may transmit the CLI indication via Msg3 (e.g., MAC-CE) of the RACH procedure. In such cases, Msg3 may include dedicated bit fields for CLI indications, and may be transmitted via a RACH beam of the second relay UE 115-*k*.

In some aspects, the third message may include information which may be used to help mitigate CLI experienced at the victim base station 105-*h*, including identifiers associated with the victim base station 105-*h* and/or the aggressor base station 105-*i*, an indication of the CLI measured at 530, requests/indications for the aggressor base station 105-*i* to adjust communications parameters to mitigate CLI, beam information (e.g., beam identifiers) of the aggressor base station 105-*i* which are associated (e.g., cause) the CLI, or any combination thereof.

At 585, the aggressor base station 105-*i* may selectively adjust or modify one or more communications parameters associated with communications at the aggressor base station 105-*i* based on receiving the second message including the CLI indication at 580. The aggressor base station 105-*h* may adjust communications parameters in order to reduce or eliminate CLI experienced at the victim base station 105-*h*. The aggressor base station 105-*i* may then be configured to perform communications (e.g., communicate with UEs 115 served by the aggressor base station 105-*i*) in accordance with the adjusted communications parameters.

In particular, the aggressor base station 105-*i* may selectively adjust communications parameters based on information received within the second message, including identifiers associated with the victim base station 105-*h* and/or the aggressor base station 105-*i*, an indication of the CLI measured at 530, requests/indications for the aggressor base station 105-*i* to adjust communications parameters to mitigate CLI, beam information (e.g., beam identifiers) of the aggressor base station 105-*i* which are associated (e.g., cause) the CLI, or any combination thereof. Communications parameters which may be selectively adjusted at the aggressor base station 105-*i* in order to reduce or eliminate CLI experienced at the victim base station 105-*h* may include, but are not limited to, a transmit beam used to transmit signals by the aggressor base station 105-*h*, a transmit power associated with signals transmitted by the aggressor base station 105-*h*, resource configurations including uplink and downlink resources used for communications at the aggressor base station 105-*i*, or any combination thereof.

Techniques described herein may facilitate the communication of CLI indications between the victim base station 105-*h* and the aggressor base station 105-*i*, which may inter-gNB CLI experienced within the wireless communications system. In particular, by enabling CLI indications to be communicated between the base stations 105 using the relay UEs 115, techniques described herein may increase the effective communication range of the victim base station 105-*h* for communicating CLI indications, which may lead to decreased inter-gNB CLI, reduced noise, and higher reliability within the wireless communications system. Moreover, by reducing CLI experienced at the victim base station 105-*h*, techniques described herein may enable the victim base station 105-*h* to effectively reduce a transmit power used to perform wireless communications as compared to the transmit power used in the presence of inter-gNB CLI, thereby reducing power consumption within the wireless communications system.

Figure 6:
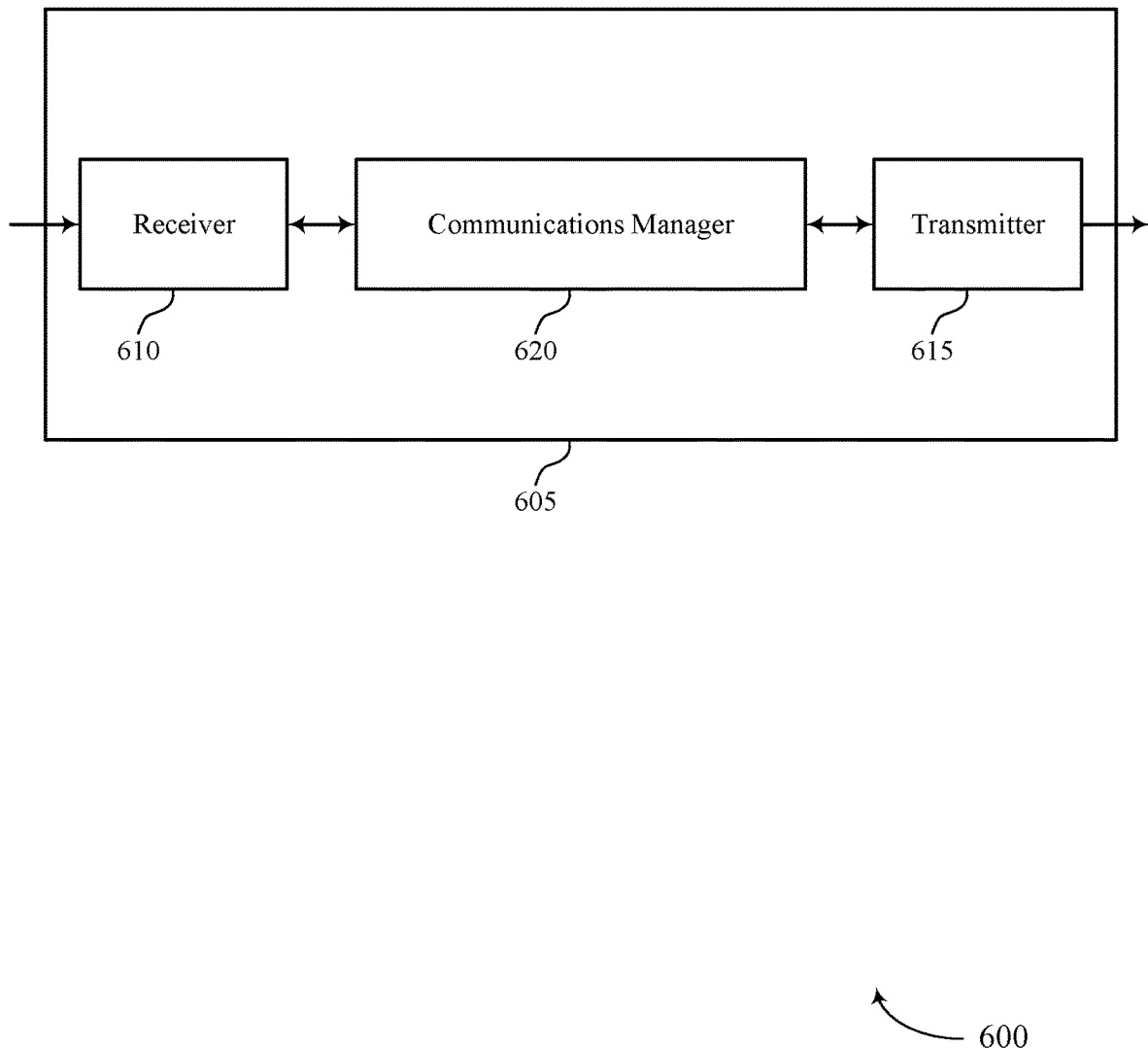
FIGS. 6 and 7 show block diagrams of devices that support techniques for inter-base station messaging for inter-base station CLI mitigation in accordance with aspects of the present disclosure.

FIG. 6 shows a block diagram 600 of a device 605 that supports techniques for inter-base station messaging for inter-base station CLI mitigation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for inter-base station messaging for inter-base station CLI mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for inter-base station messaging for inter-base station CLI mitigation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for inter-base station messaging for inter-base station CLI mitigation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

For example, the communications manager 620 may be configured as or otherwise support a means for receiving a first message including a CLI indication associated with CLI experienced by a first base station which is associated with signals transmitted by a second base station. The communications manager 620 may be configured as or otherwise support a means for generating, at least in part in response to the first message, a second message including the CLI indication. The communications manager 620 may be configured as or otherwise support a means for transmitting the second message including the CLI indication.

By including or configuring the communications manager 620 in accordance with examples as described herein, the device 605 (e.g., a processor controlling or otherwise coupled to the receiver 610, the transmitter 615, the communications manager 620, or a combination thereof) may support techniques which may facilitate the communication of CLI indications between a victim base station 105 and an aggressor base station 105, which may inter-gNB CLI experienced within the wireless communications system. In particular, by enabling CLI indications to be communicated between the base stations 105 using one or more relay UEs 115, techniques described herein may increase the effective communication range of the victim base station 105 for communicating CLI indications, which may lead to decreased inter-gNB CLI, reduced noise, and higher reliability within the wireless communications system. Moreover, by reducing CLI experienced at the victim base station 105, techniques described herein may enable the victim base station 105 to effectively reduce a transmit power used to perform wireless communications as compared to the transmit power used in the presence of inter-gNB CLI, thereby reducing power consumption within the wireless communications system.

Figure 7:
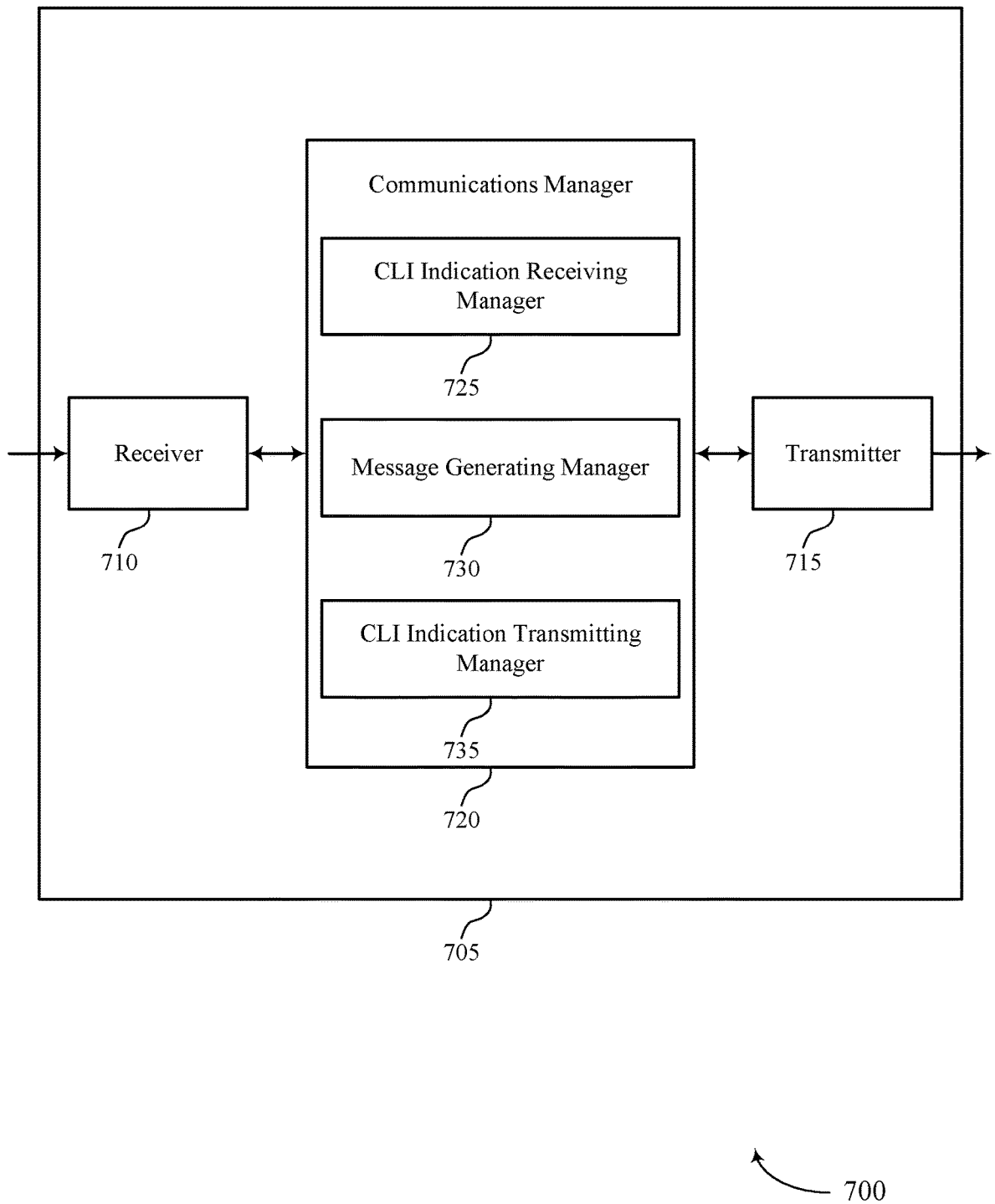

FIG. 7 shows a block diagram 700 of a device 705 that supports techniques for inter-base station messaging for inter-base station CLI mitigation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for inter-base station messaging for inter-base station CLI mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for inter-base station messaging for inter-base station CLI mitigation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for inter-base station messaging for inter-base station CLI mitigation as described herein. For example, the communications manager 720 may include a CLI indication receiving manager 725, a message generating manager 730, a CLI indication transmitting manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The CLI indication receiving manager 725 may be configured as or otherwise support a means for receiving a first message including a CLI indication associated with CLI experienced by a first base station which is associated with signals transmitted by a second base station. The message generating manager 730 may be configured as or otherwise support a means for generating, at least in part in response to the first message, a second message including the CLI indication. The CLI indication transmitting manager 735 may be configured as or otherwise support a means for transmitting the second message including the CLI indication.

Figure 8:
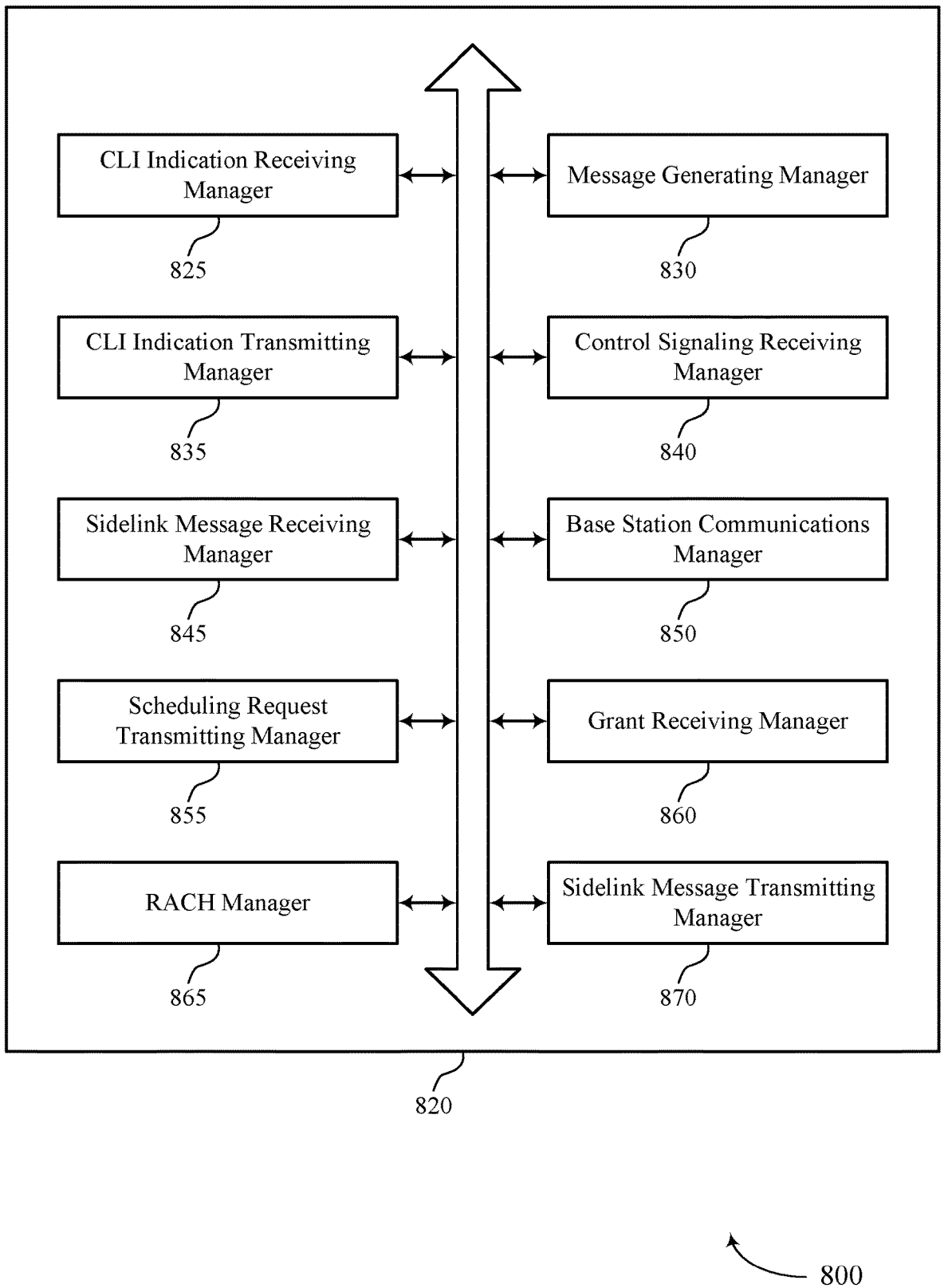
FIG. 8 shows a block diagram of a communications manager that supports techniques for inter-base station messaging for inter-base station CLI mitigation in accordance with aspects of the present disclosure.

FIG. 8 shows a block diagram 800 of a communications manager 820 that supports techniques for inter-base station messaging for inter-base station CLI mitigation in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for inter-base station messaging for inter-base station CLI mitigation as described herein. For example, the communications manager 820 may include a CLI indication receiving manager 825, a message generating manager 830, a CLI indication transmitting manager 835, a control signaling receiving manager 840, a sidelink message receiving manager 845, a base station communications manager 850, a scheduling request transmitting manager 855, a grant receiving manager 860, a RACH manager 865, a sidelink message transmitting manager 870, or any combination thereof. Each of these components may communicate, directly or indirectly, with one another (e.g., via one or more buses).

The CLI indication receiving manager 825 may be configured as or otherwise support a means for receiving a first message including a CLI indication associated with CLI experienced by a first base station which is associated with signals transmitted by a second base station. The message generating manager 830 may be configured as or otherwise support a means for generating, at least in part in response to the first message, a second message including the CLI indication. The CLI indication transmitting manager 835 may be configured as or otherwise support a means for transmitting the second message including the CLI indication.

In some examples, the control signaling receiving manager 840 may be configured as or otherwise support a means for receiving, via the first base station, the second base station, or both, control signaling including an indication of a resource to relay the CLI indication, where the second message is generated in response to the control signaling, and where the second message is transmitted within the resource.

In some examples, the control signaling receiving manager 840 may be configured as or otherwise support a means for receiving, via the first base station, the second base station, or both, control signaling including one or more relay selection criteria for relaying the CLI indication, where the UE generates and transmits the second message based on a satisfaction of the one or more relay selection criteria.

In some examples, the satisfaction of the one or more relay selection criteria is based on a first signal strength associated with signals received at the UE from the first base station, a second signal strength associated with signals received at the UE from the second base station, or both, satisfying a threshold signal strength.

In some examples, the CLI indication transmitting manager 835 may be configured as or otherwise support a means for transmitting the second message based on a comparison of a first priority associated with the CLI indication and a second priority associated with additional traffic that is to be transmitted by the UE.

In some examples, the control signaling receiving manager 840 may be configured as or otherwise support a means for receiving, from the first base station, the second base station, or both, an indication of a priority configuration associated with a relative priority between the CLI indication and the additional traffic, where the comparison is based on the priority configuration.

In some examples, the control signaling receiving manager 840 may be configured as or otherwise support a means for receiving control signaling including an indication of a set of power control parameters associated with communications performed with the second base station, where the second message is transmitted to the second base station in accordance with the set of power control parameters. In some examples, the control signaling including the indication of the set of power control parameters is received via the first base station, the second base station, or both. In some examples, the set of power control parameters includes a transmit power value, an alpha value, a closed loop index, a PL RS, or any combination thereof.

In some examples, the control signaling receiving manager 840 may be configured as or otherwise support a means for receiving, from the first base station, a downlink message associated with a beam management procedure performed between the UE and the first base station, where the first message is received from the first base station based on a receive beam at the UE that was determined in accordance with the beam management procedure.

In some examples, the control signaling receiving manager 840 may be configured as or otherwise support a means for receiving, from the second base station, a downlink message associated with a beam management procedure performed between the UE and the second base station, where the second message is transmitted to the second base station based on a transmit beam at the UE that was determined in accordance with the beam management procedure.

In some examples, the control signaling receiving manager 840 may be configured as or otherwise support a means for receiving beam management information associated with identifying a transmit beam at the UE for transmitting the second message, where the second message is transmitted based at least in part on the transmit beam that is identified in accordance with the beam management information.

In some examples, the sidelink message receiving manager 845 may be configured as or otherwise support a means for receiving, from a second UE, a sidelink message associated with a beam management procedure performed between the UE and the second UE, where the second message is transmitted to the second UE based on a transmit beam at the UE that was determined in accordance with the beam management procedure, and where the second message includes an indication for the second UE to relay the CLI indication to the second base station.

In some examples, the CLI indication receiving manager 825 may be configured as or otherwise support a means for receiving the first message from the first base station, where the first message includes an identifier associated with the second base station. In some examples, the CLI indication transmitting manager 835 may be configured as or otherwise support a means for transmitting the second message to the second base station based on the identifier.

In some examples, the message generating manager 830 may be configured as or otherwise support a means for generating, at least in part in response to the first message, a third message including the additional CLI indication. In some examples, the CLI indication transmitting manager 835 may be configured as or otherwise support a means for transmitting the third message including the additional CLI indication to the third base station.

In some examples, where the second message is transmitted within a first transmission time interval and the third message is transmitted within a second transmission time interval different from the first transmission time interval. In some examples, where the second message is transmitted via a first transmit beam associated with a first spatial orientation and the third message is transmitted via a second transmit beam associated with a second spatial orientation different from the first spatial orientation.

In some examples, the base station communications manager 850 may be configured as or otherwise support a means for identifying, based on the first message, that the UE is unable to communicate with the second base station. In some examples, the sidelink message receiving manager 845 may be configured as or otherwise support a means for receiving, from a second UE and based on the identifying, a sidelink message including an indication of at least one serving base station associated with the second UE, the at least one serving base station including the second base station. In some examples, the CLI indication transmitting manager 835 may be configured as or otherwise support a means for transmitting the second message to the second UE based on receiving the sidelink message, where the second message includes an indication for the second UE to relay the CLI indication to the second base station.

In some examples, the sidelink message transmitting manager 870 may be configured as or otherwise support a means for transmitting a request to at least the second UE based on identifying that the UE is unable to communicate with the second base station, where the sidelink message is received in response to the request.

In some examples, the sidelink message receiving manager 845 may be configured as or otherwise support a means for receiving a feedback message from the second UE in response to the second message.

In some examples, the scheduling request transmitting manager 855 may be configured as or otherwise support a means for transmitting a scheduling request to the second base station based on receiving the first message. In some examples, the grant receiving manager 860 may be configured as or otherwise support a means for receiving, from the second base station in response to the scheduling request, a grant including a set of resources, where the second message is transmitted to the second base station within the set of resources.

In some examples, the RACH manager 865 may be configured as or otherwise support a means for transmitting, to the second base station, a random access message of a random access procedure between the UE and the second base station, where the random access message includes a request for a grant. In some examples, the grant receiving manager 860 may be configured as or otherwise support a means for receiving, from the second base station in response to the random access message, the grant including a set of resources, where the second message is transmitted to the second base station within the set of resources.

In some examples, the RACH manager 865 may be configured as or otherwise support a means for transmitting, to the second base station, a random access message of a random access procedure between the UE and the second base station, where the second message including the CLI indication includes the random access message.

Figure 9:
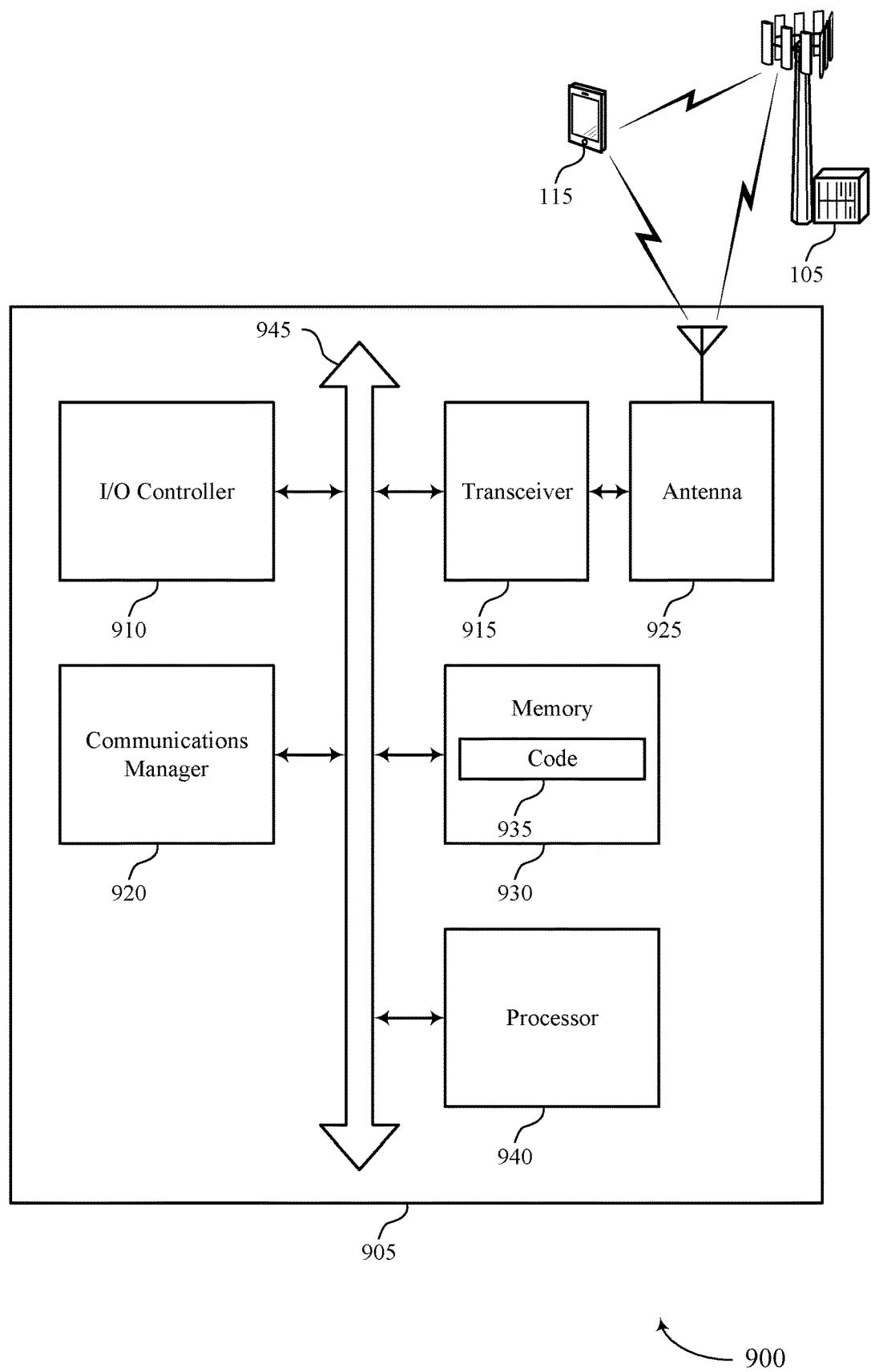
FIG. 9 shows a diagram of a system including a device that supports techniques for inter-base station messaging for inter-base station CLI mitigation in accordance with aspects of the present disclosure.

FIG. 9 shows a diagram of a system 900 including a device 905 that supports techniques for inter-base station messaging for inter-base station CLI mitigation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for inter-base station messaging for inter-base station CLI mitigation). For example, the device 905 or a component of the device 905 may include a processor 940 and memory 930 coupled to the processor 940, the processor 940 and memory 930 configured to perform various functions described herein.

For example, the communications manager 920 may be configured as or otherwise support a means for receiving a first message including a CLI indication associated with CLI experienced by a first base station which is associated with signals transmitted by a second base station. The communications manager 920 may be configured as or otherwise support a means for generating, at least in part in response to the first message, a second message including the CLI indication. The communications manager 920 may be configured as or otherwise support a means for transmitting the second message including the CLI indication.

By including or configuring the communications manager 920 in accordance with examples as described herein, the device 905 may support techniques which may facilitate the communication of CLI indications between a victim base station 105 and an aggressor base station 105, which may inter-gNB CLI experienced within the wireless communications system. In particular, by enabling CLI indications to be communicated between the base stations 105 using one or more relay UEs 115, techniques described herein may increase the effective communication range of the victim base station 105 for communicating CLI indications, which may lead to decreased inter-gNB CLI, reduced noise, and higher reliability within the wireless communications system. Moreover, by reducing CLI experienced at the victim base station 105, techniques described herein may enable the victim base station 105 to effectively reduce a transmit power used to perform wireless communications as compared to the transmit power used in the presence of inter-gNB CLI, thereby reducing power consumption within the wireless communications system.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for inter-base station messaging for inter-base station CLI mitigation as described herein, or the processor 940 and the memory 930 may be otherwise configured to perform or support such operations.

Figure 10:
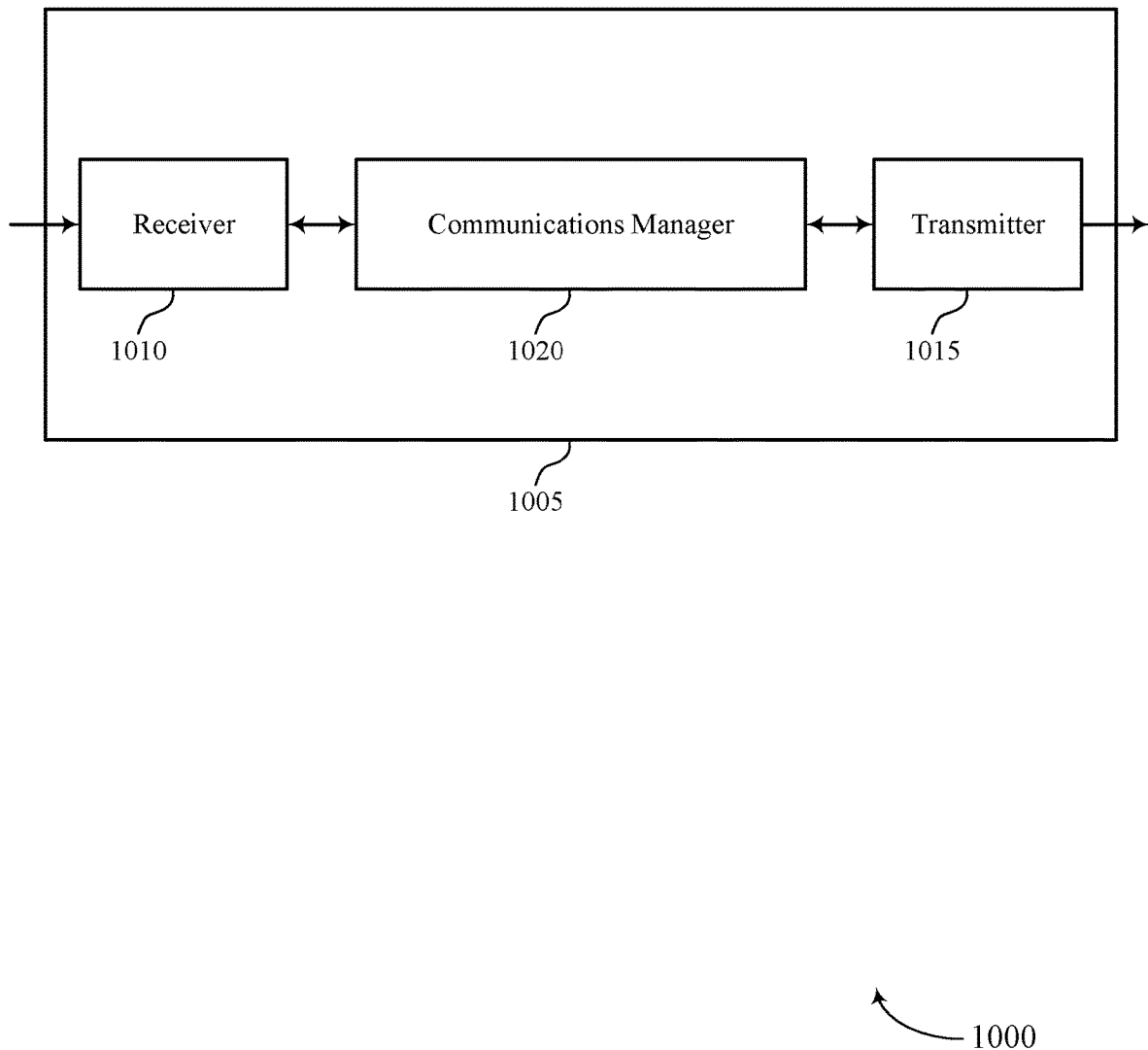
FIGS. 10 and 11 show block diagrams of devices that support techniques for inter-base station messaging for inter-base station CLI mitigation in accordance with aspects of the present disclosure.

FIG. 10 shows a block diagram 1000 of a device 1005 that supports techniques for inter-base station messaging for inter-base station CLI mitigation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for inter-base station messaging for inter-base station CLI mitigation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for inter-base station messaging for inter-base station CLI mitigation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for inter-base station messaging for inter-base station CLI mitigation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

For example, the communications manager 1020 may be configured as or otherwise support a means for receiving a signal from a second base station. The communications manager 1020 may be configured as or otherwise support a means for measuring CLI at the first base station that is associated with the signal received from the second base station. The communications manager 1020 may be configured as or otherwise support a means for transmitting a message including a CLI indication to a relay UE served by the first base station based on the measured CLI satisfying an interference threshold, where the CLI indication is transmitted to the relay UE for relay to the second base station.

For example, the communications manager 1020 may be configured as or otherwise support a means for receiving, from a relay UE that is served by the second base station, a message including a CLI indication associated with CLI experienced at a first base station that is attributable to signals transmitted by the second base station. The communications manager 1020 may be configured as or otherwise support a means for selectively adjusting one or more communications parameters associated with communications at the second base station based on the CLI indication. The communications manager 1020 may be configured as or otherwise support a means for communicating with one or more wireless devices in accordance with the one or more adjusted communications parameters.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques which may facilitate the communication of CLI indications between a victim base station 105 and an aggressor base station 105, which may inter-gNB CLI experienced within the wireless communications system. In particular, by enabling CLI indications to be communicated between the base stations 105 using one or more relay UEs 115, techniques described herein may increase the effective communication range of the victim base station 105 for communicating CLI indications, which may lead to decreased inter-gNB CLI, reduced noise, and higher reliability within the wireless communications system. Moreover, by reducing CLI experienced at the victim base station 105, techniques described herein may enable the victim base station 105 to effectively reduce a transmit power used to perform wireless communications as compared to the transmit power used in the presence of inter-gNB CLI, thereby reducing power consumption within the wireless communications system.

Figure 11:
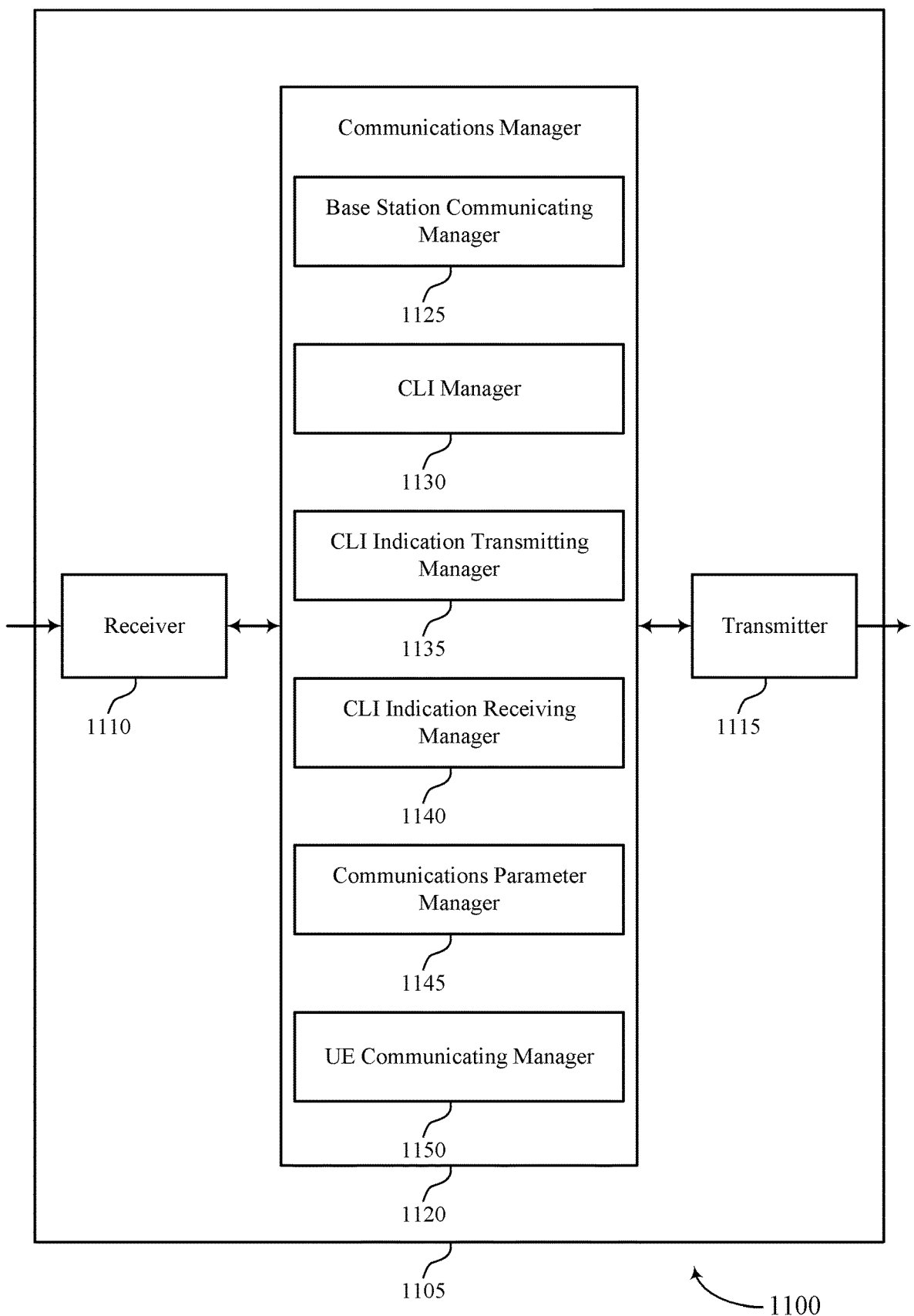

FIG. 11 shows a block diagram 1100 of a device 1105 that supports techniques for inter-base station messaging for inter-base station CLI mitigation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for inter-base station messaging for inter-base station CLI mitigation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for inter-base station messaging for inter-base station CLI mitigation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for inter-base station messaging for inter-base station CLI mitigation as described herein. For example, the communications manager 1120 may include a base station communicating manager 1125, a CLI manager 1130, a CLI indication transmitting manager 1135, a CLI indication receiving manager 1140, a communications parameter manager 1145, a UE communicating manager 1150, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The base station communicating manager 1125 may be configured as or otherwise support a means for receiving a signal from a second base station. The CLI manager 1130 may be configured as or otherwise support a means for measuring CLI at the first base station that is associated with the signal received from the second base station. The CLI indication transmitting manager 1135 may be configured as or otherwise support a means for transmitting a message including a CLI indication to a relay UE served by the first base station based on the measured CLI satisfying an interference threshold, where the CLI indication is transmitted to the relay UE for relay to the second base station.

The CLI indication receiving manager 1140 may be configured as or otherwise support a means for receiving, from a relay UE that is served by the second base station, a message including a CLI indication associated with CLI experienced at a first base station that is attributable to signals transmitted by the second base station. The communications parameter manager 1145 may be configured as or otherwise support a means for selectively adjusting one or more communications parameters associated with communications at the second base station based on the CLI indication. The UE communicating manager 1150 may be configured as or otherwise support a means for communicating with one or more wireless devices in accordance with the one or more adjusted communications parameters.

Figure 12:
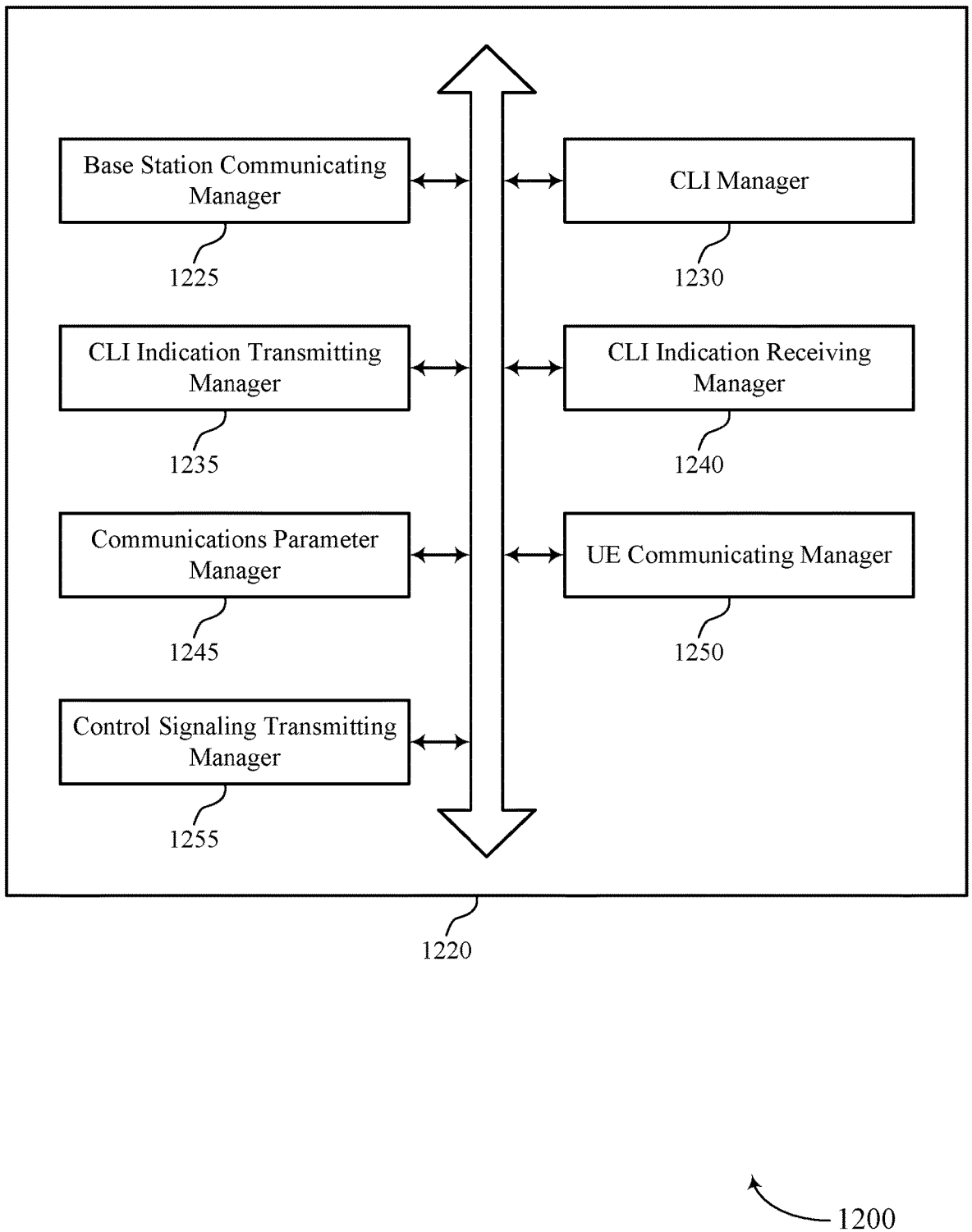
FIG. 12 shows a block diagram of a communications manager that supports techniques for inter-base station messaging for inter-base station CLI mitigation in accordance with aspects of the present disclosure.

FIG. 12 shows a block diagram 1200 of a communications manager 1220 that supports techniques for inter-base station messaging for inter-base station CLI mitigation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for inter-base station messaging for inter-base station CLI mitigation as described herein. For example, the communications manager 1220 may include a base station communicating manager 1225, a CLI manager 1230, a CLI indication transmitting manager 1235, a CLI indication receiving manager 1240, a communications parameter manager 1245, a UE communicating manager 1250, a control signaling transmitting manager 1255, or any combination thereof. Each of these components may communicate, directly or indirectly, with one another (e.g., via one or more buses).

The base station communicating manager 1225 may be configured as or otherwise support a means for receiving a signal from a second base station. The CLI manager 1230 may be configured as or otherwise support a means for measuring CLI at the first base station that is associated with the signal received from the second base station. The CLI indication transmitting manager 1235 may be configured as or otherwise support a means for transmitting a message including a CLI indication to a relay UE served by the first base station based on the measured CLI satisfying an interference threshold, where the CLI indication is transmitted to the relay UE for relay to the second base station.

In some examples, the control signaling transmitting manager 1255 may be configured as or otherwise support a means for transmitting, to the relay UE, control signaling including an indication of a resource to relay the CLI indication to the second base station, an additional relay UE, or both. In some examples, the control signaling transmitting manager 1255 may be configured as or otherwise support a means for transmitting, to the relay UE, control signaling including one or more relay selection criteria for relaying the CLI indication.

In some examples, the control signaling transmitting manager 1255 may be configured as or otherwise support a means for transmitting, to the relay UE, an indication of a priority configuration associated with a relative priority between the CLI indication and additional traffic at the relay UE. In some examples, the control signaling transmitting manager 1255 may be configured as or otherwise support a means for transmitting, to the relay UE, control signaling including an indication of a set of power control parameters associated with communications performed with the second base station, where the set of power control parameters includes a transmit power value, an alpha value, a closed loop index, a PL RS, or any combination thereof.

The CLI indication receiving manager 1240 may be configured as or otherwise support a means for receiving, from a relay UE that is served by the second base station, a message including a CLI indication associated with CLI experienced at a first base station that is attributable to signals transmitted by the second base station. The communications parameter manager 1245 may be configured as or otherwise support a means for selectively adjusting one or more communications parameters associated with communications at the second base station based on the CLI indication. The UE communicating manager 1250 may be configured as or otherwise support a means for communicating with one or more wireless devices in accordance with the one or more adjusted communications parameters.

In some examples, the control signaling transmitting manager 1255 may be configured as or otherwise support a means for transmitting, to the relay UE, control signaling including an indication of a resource to relay the CLI indication to the second base station, where the message is received within the resource. In some examples, the control signaling transmitting manager 1255 may be configured as or otherwise support a means for transmitting, to the relay UE, control signaling including an indication of a set of power control parameters associated with communications performed with the second base station, where the set of power control parameters includes a transmit power value, an alpha value, a closed loop index, a PL RS, or any combination thereof.

In some examples, the control signaling transmitting manager 1255 may be configured as or otherwise support a means for transmitting, to the relay UE, a downlink message associated with a beam management procedure performed between the relay UE and the second base station, where the message is transmitted by the relay UE to the second base station based on a transmit beam at the relay UE that was determined in accordance with the beam management procedure. In some examples, the one or more communications parameters include a transmit beam used to transmit signals by the second base station, a transmit power associated with signals transmitted by the second base station, resource configurations including uplink and downlink resources used for communications at the second base station, or any combination thereof.

Figure 13:
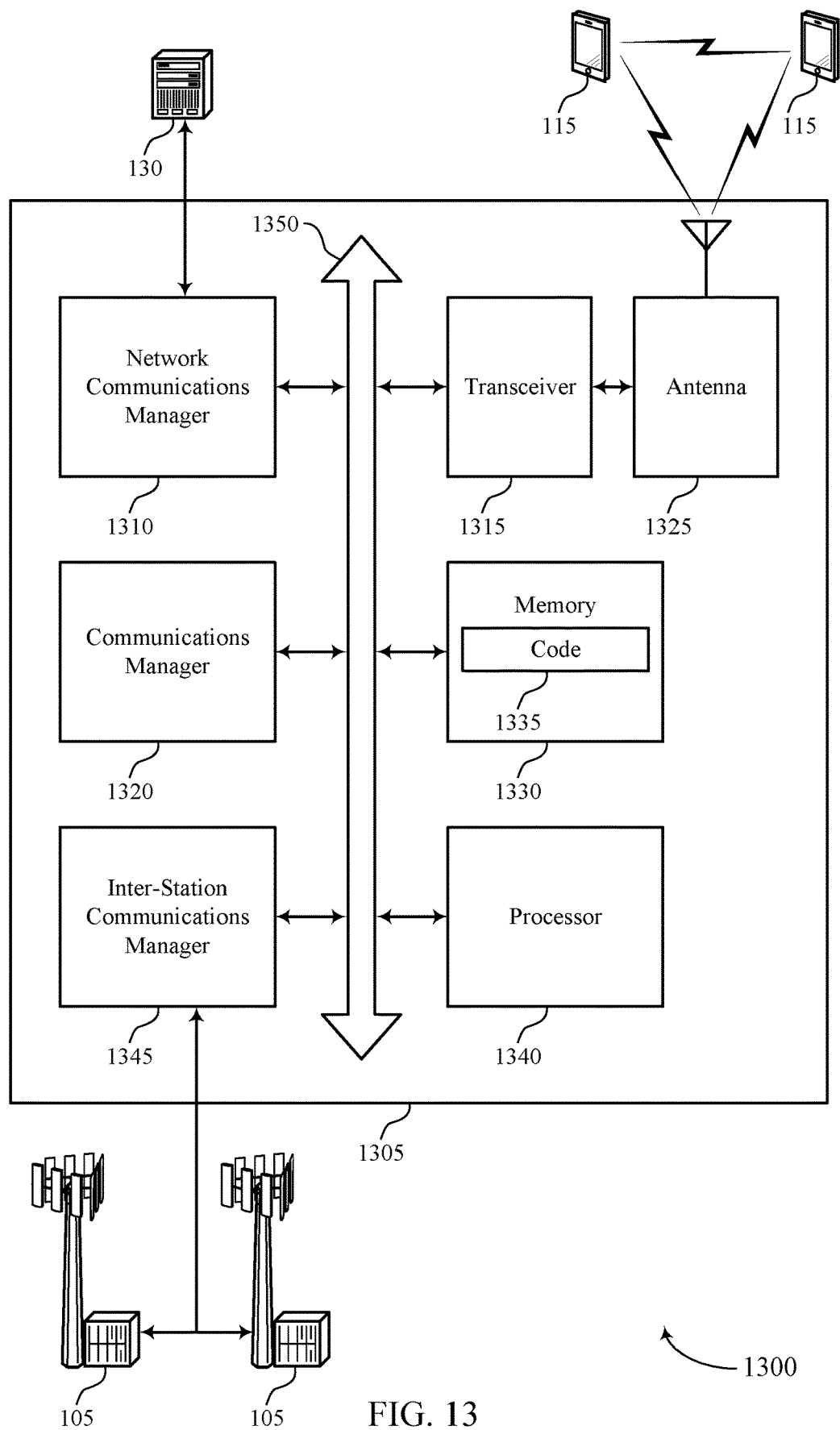
FIG. 13 shows a diagram of a system including a device that supports techniques for inter-base station messaging for inter-base station CLI mitigation in accordance with aspects of the present disclosure.

FIG. 13 shows a diagram of a system 1300 including a device 1305 that supports techniques for inter-base station messaging for inter-base station CLI mitigation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for inter-base station messaging for inter-base station CLI mitigation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

For example, the communications manager 1320 may be configured as or otherwise support a means for receiving a signal from a second base station. The communications manager 1320 may be configured as or otherwise support a means for measuring CLI at the first base station that is associated with the signal received from the second base station. The communications manager 1320 may be configured as or otherwise support a means for transmitting a message including a CLI indication to a relay UE served by the first base station based on the measured CLI satisfying an interference threshold, where the CLI indication is transmitted to the relay UE for relay to the second base station.

For example, the communications manager 1320 may be configured as or otherwise support a means for receiving, from a relay UE that is served by the second base station, a message including a CLI indication associated with CLI experienced at a first base station that is attributable to signals transmitted by the second base station. The communications manager 1320 may be configured as or otherwise support a means for selectively adjusting one or more communications parameters associated with communications at the second base station based on the CLI indication. The communications manager 1320 may be configured as or otherwise support a means for communicating with one or more wireless devices in accordance with the one or more adjusted communications parameters.

By including or configuring the communications manager 1320 in accordance with examples as described herein, the device 1305 may support techniques which may facilitate the communication of CLI indications between a victim base station 105 and an aggressor base station 105, which may inter-gNB CLI experienced within the wireless communications system. In particular, by enabling CLI indications to be communicated between the base stations 105 using one or more relay UEs 115, techniques described herein may increase the effective communication range of the victim base station 105 for communicating CLI indications, which may lead to decreased inter-gNB CLI, reduced noise, and higher reliability within the wireless communications system. Moreover, by reducing CLI experienced at the victim base station 105, techniques described herein may enable the victim base station 105 to effectively reduce a transmit power used to perform wireless communications as compared to the transmit power used in the presence of inter-gNB CLI, thereby reducing power consumption within the wireless communications system.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for inter-base station messaging for inter-base station CLI mitigation as described herein, or the processor 1340 and the memory 1330 may be otherwise configured to perform or support such operations.

Figure 14:
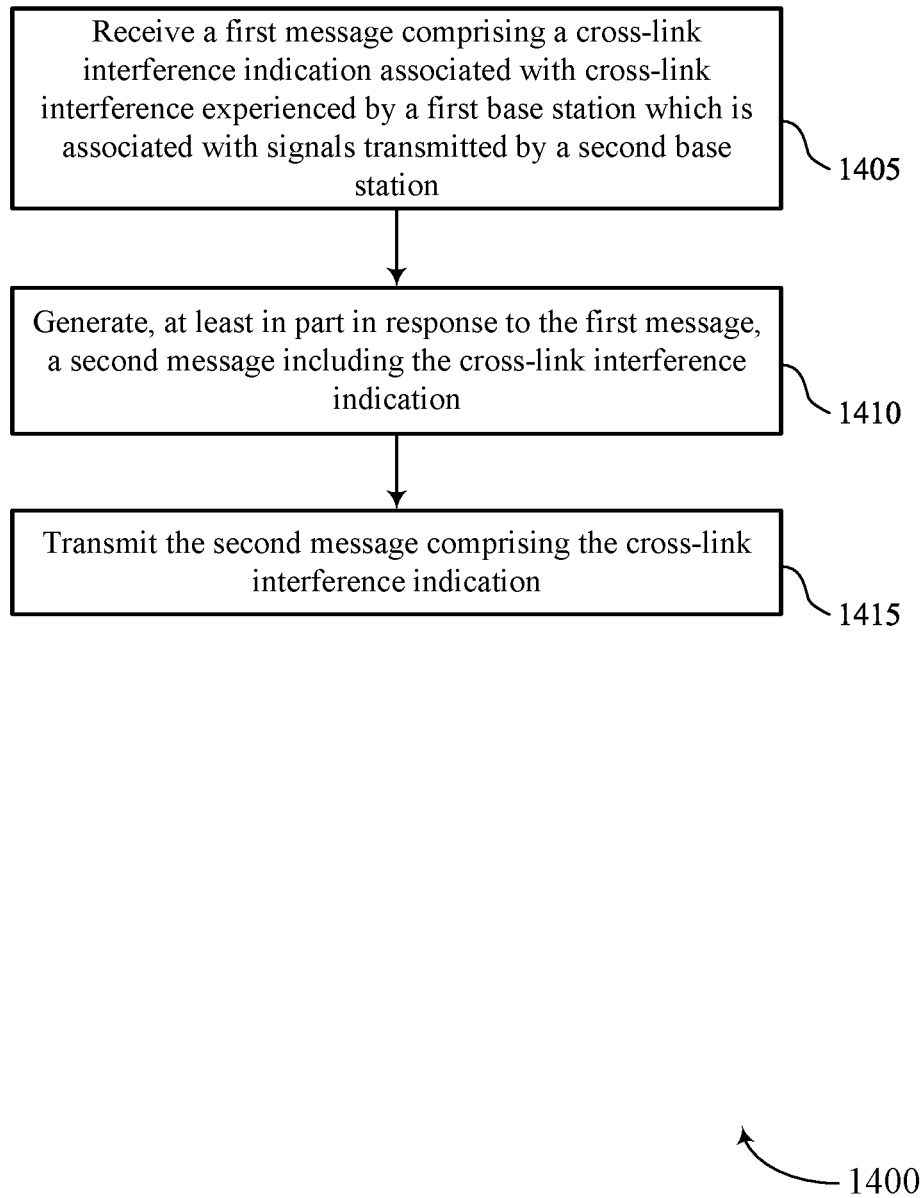
FIGS. 14 through 18 show flowcharts illustrating methods that support techniques for inter-base station messaging for inter-base station CLI mitigation in accordance with aspects of the present disclosure.

FIG. 14 shows a flowchart illustrating a method 1400 that supports techniques for inter-base station messaging for inter-base station CLI mitigation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a first message including a CLI indication associated with CLI experienced by a first base station which is associated with signals transmitted by a second base station. The operations of 1405 may be performed in accordance with examples as disclosed herein. In some examples, aspects of the operations of 1405 may be performed by a CLI indication receiving manager 825 as described with reference to FIG. 8.

At 1410, the method may include generating, at least in part in response to the first message, a second message including the CLI indication. The operations of 1410 may be performed in accordance with examples as disclosed herein. In some examples, aspects of the operations of 1410 may be performed by a message generating manager 830 as described with reference to FIG. 8.

At 1415, the method may include transmitting the second message including the CLI indication. The operations of 1415 may be performed in accordance with examples as disclosed herein. In some examples, aspects of the operations of 1415 may be performed by a CLI indication transmitting manager 835 as described with reference to FIG. 8.

Figure 15:
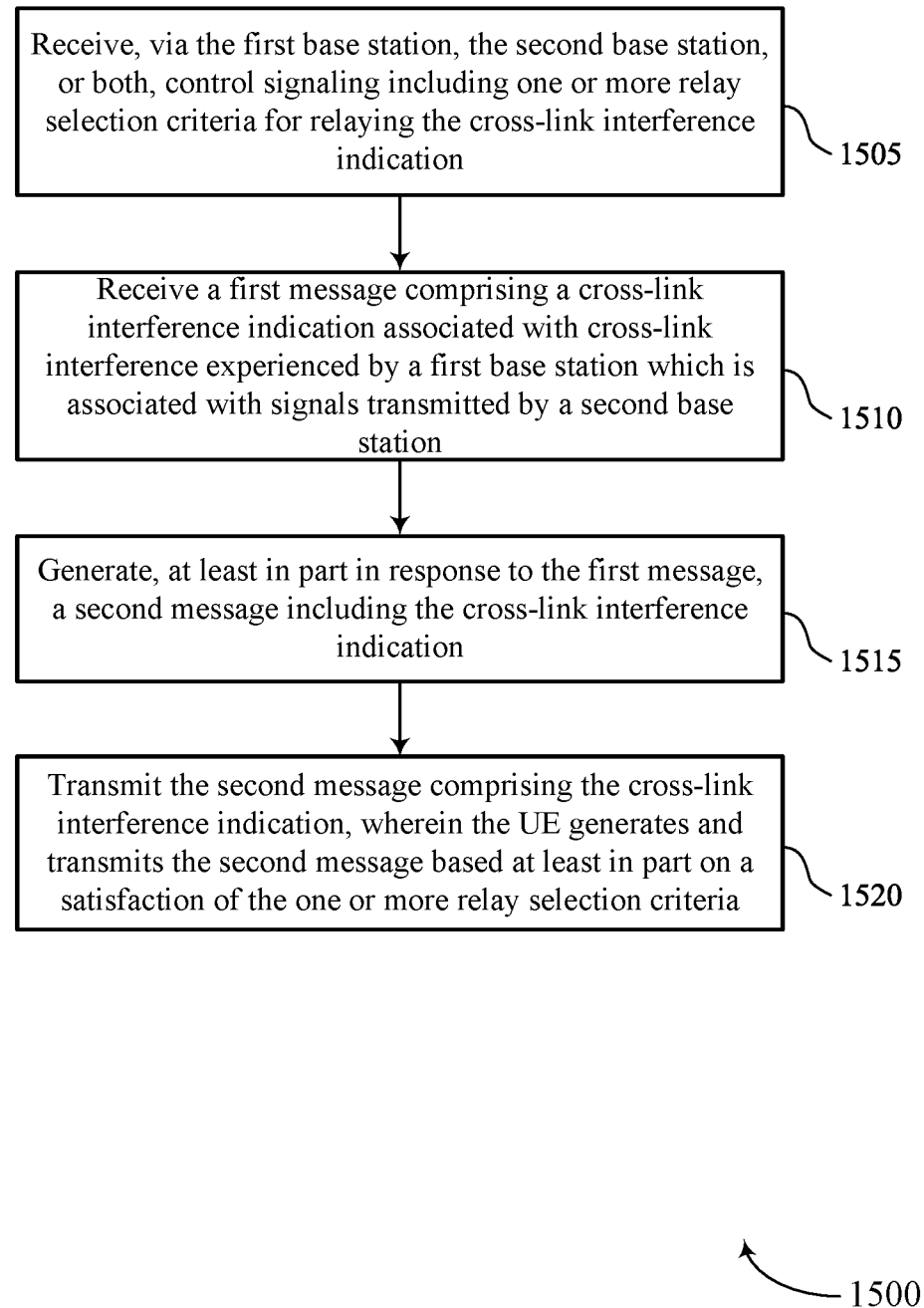

FIG. 15 shows a flowchart illustrating a method 1500 that supports techniques for inter-base station messaging for inter-base station CLI mitigation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, via the first base station, the second base station, or both, control signaling including one or more relay selection criteria for relaying the CLI indication. The operations of 1505 may be performed in accordance with examples as disclosed herein. In some examples, aspects of the operations of 1505 may be performed by a control signaling receiving manager 840 as described with reference to FIG. 8.

At 1510, the method may include receiving a first message including a CLI indication associated with CLI experienced by a first base station which is associated with signals transmitted by a second base station. The operations of 1510 may be performed in accordance with examples as disclosed herein. In some examples, aspects of the operations of 1510 may be performed by a CLI indication receiving manager 825 as described with reference to FIG. 8.

At 1515, the method may include generating, at least in part in response to the first message, a second message including the CLI indication. The operations of 1515 may be performed in accordance with examples as disclosed herein. In some examples, aspects of the operations of 1515 may be performed by a message generating manager 830 as described with reference to FIG. 8.

At 1520, the method may include transmitting the second message including the CLI indication, where the UE generates and transmits the second message based on a satisfaction of the one or more relay selection criteria. The operations of 1520 may be performed in accordance with examples as disclosed herein. In some examples, aspects of the operations of 1520 may be performed by a CLI indication transmitting manager 835 as described with reference to FIG. 8.

Figure 16:
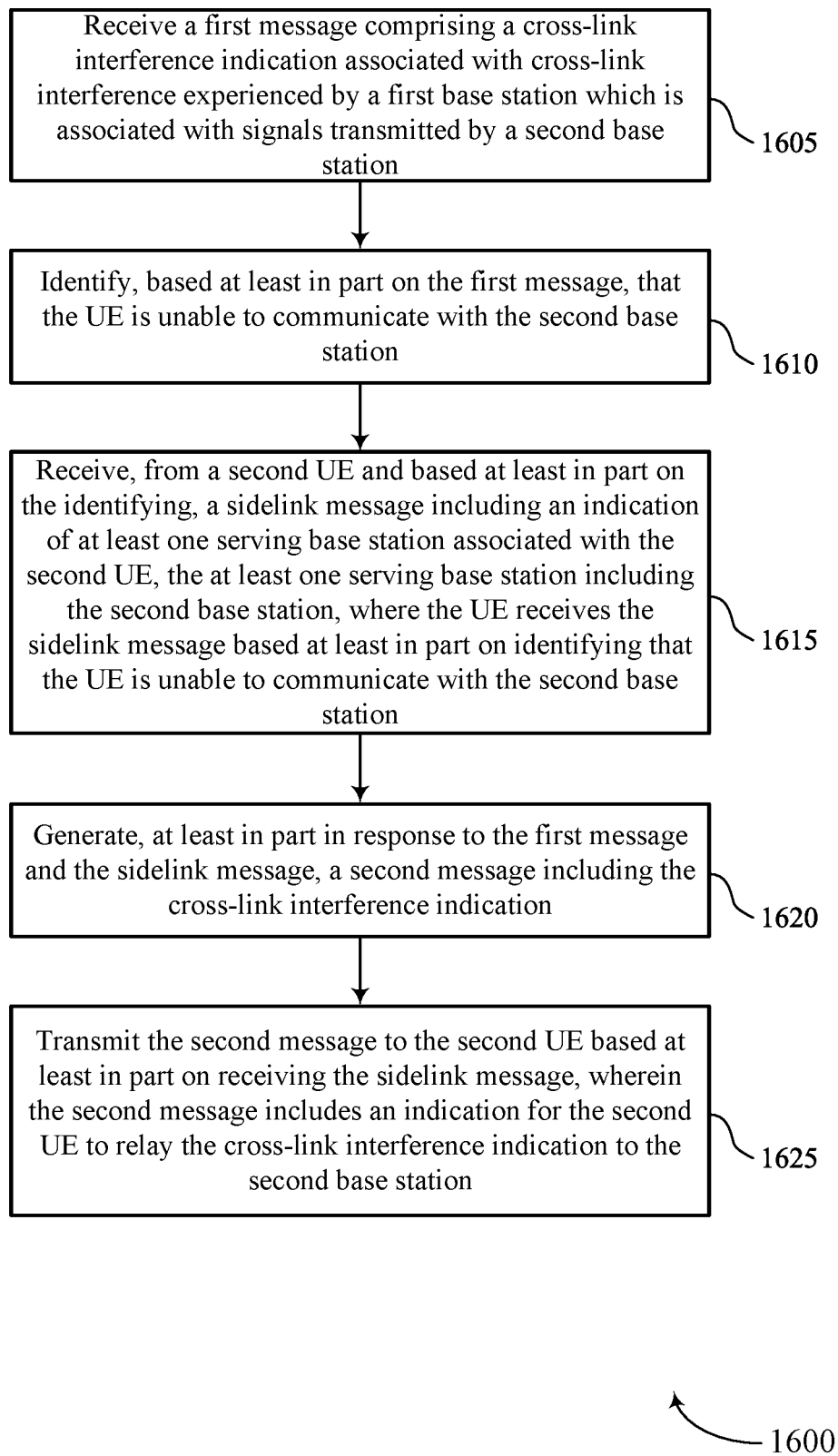

FIG. 16 shows a flowchart illustrating a method 1600 that supports techniques for inter-base station messaging for inter-base station CLI mitigation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a first message including a CLI indication associated with CLI experienced by a first base station which is associated with signals transmitted by a second base station. The operations of 1605 may be performed in accordance with examples as disclosed herein. In some examples, aspects of the operations of 1605 may be performed by a CLI indication receiving manager 825 as described with reference to FIG. 8.

At 1610, the method may include identifying, based on the first message, that the UE is unable to communicate with the second base station. The operations of 1610 may be performed in accordance with examples as disclosed herein. In some examples, aspects of the operations of 1610 may be performed by a base station communications manager 850 as described with reference to FIG. 8.

At 1615, the method may include receiving, from a second UE and based on the identifying, a sidelink message including an indication of at least one serving base station associated with the second UE, the at least one serving base station including the second base station, where the UE receives the sidelink message based at least in part on identifying that the UE is unable to communicate with the second base station. The operations of 1615 may be performed in accordance with examples as disclosed herein. In some examples, aspects of the operations of 1615 may be performed by a sidelink message receiving manager 845 as described with reference to FIG. 8.

At 1620, the method may include generating, at least in part in response to the first message and the sidelink message, a second message including the CLI indication. The operations of 1620 may be performed in accordance with examples as disclosed herein. In some examples, aspects of the operations of 1620 may be performed by a message generating manager 830 as described with reference to FIG. 8.

At 1625, the method may include transmitting the second message to the second UE based on receiving the sidelink message, where the second message includes an indication for the second UE to relay the CLI indication to the second base station. The operations of 1625 may be performed in accordance with examples as disclosed herein. In some examples, aspects of the operations of 1625 may be performed by a CLI indication transmitting manager 835 as described with reference to FIG. 8.

Figure 17:
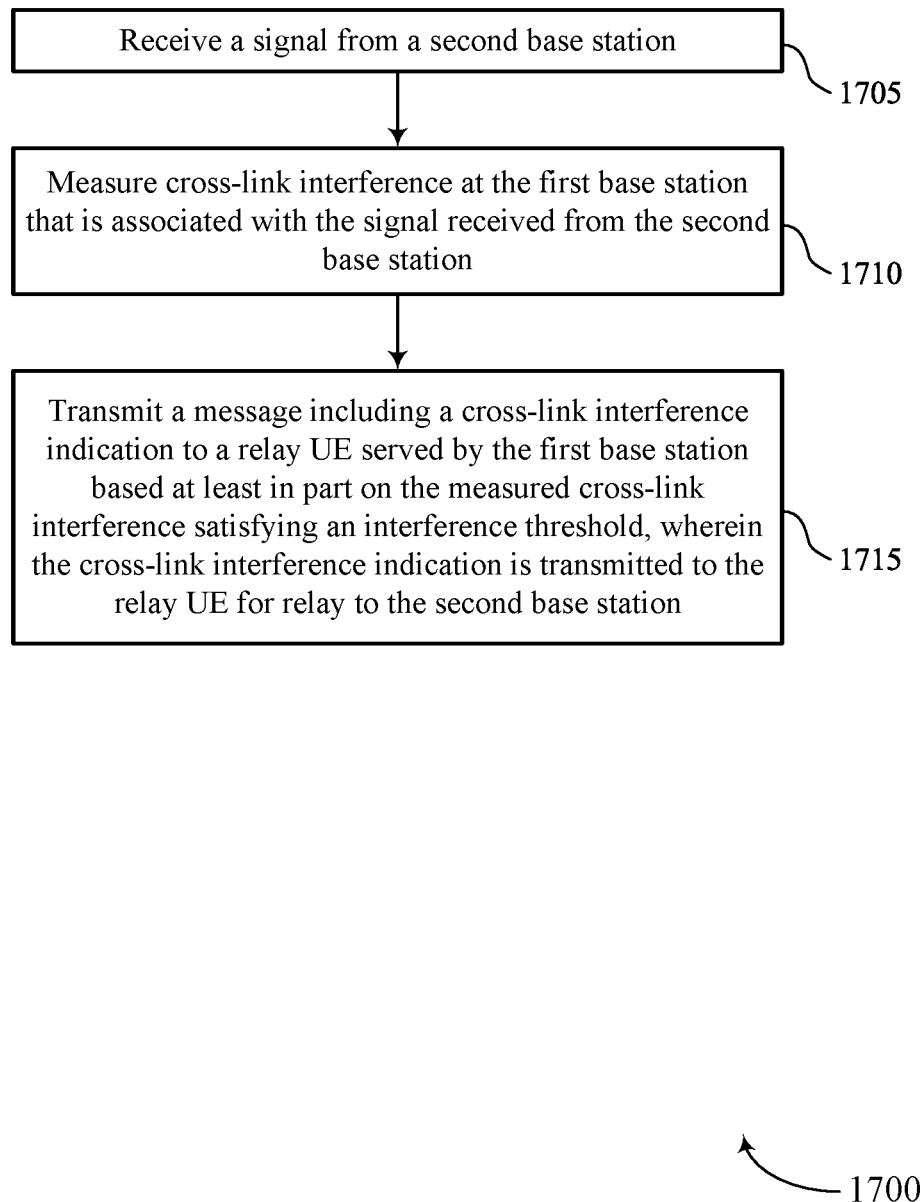

FIG. 17 shows a flowchart illustrating a method 1700 that supports techniques for inter-base station messaging for inter-base station CLI mitigation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving a signal from a second base station. The operations of 1705 may be performed in accordance with examples as disclosed herein. In some examples, aspects of the operations of 1705 may be performed by a base station communicating manager 1225 as described with reference to FIG. 12.

At 1710, the method may include measuring CLI at the first base station that is associated with the signal received from the second base station. The operations of 1710 may be performed in accordance with examples as disclosed herein. In some examples, aspects of the operations of 1710 may be performed by a CLI manager 1230 as described with reference to FIG. 12.

At 1715, the method may include transmitting a message including a CLI indication to a relay UE served by the first base station based on the measured CLI satisfying an interference threshold, where the CLI indication is transmitted to the relay UE for relay to the second base station. The operations of 1715 may be performed in accordance with examples as disclosed herein. In some examples, aspects of the operations of 1715 may be performed by a CLI indication transmitting manager 1235 as described with reference to FIG. 12.

Figure 18:
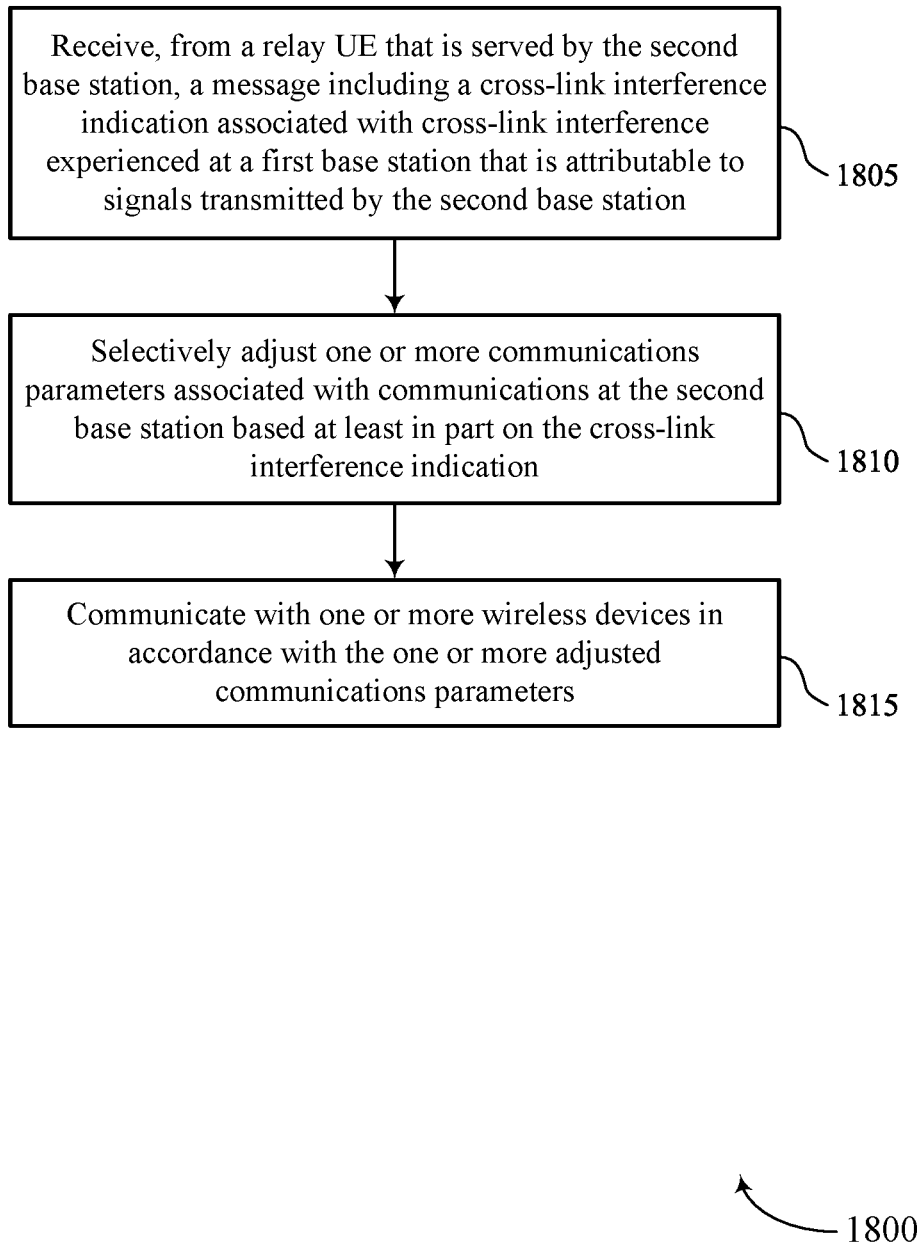

FIG. 18 shows a flowchart illustrating a method 1800 that supports techniques for inter-base station messaging for inter-base station CLI mitigation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a relay UE that is served by the second base station, a message including a CLI indication associated with CLI experienced at a first base station that is attributable to signals transmitted by the second base station. The operations of 1805 may be performed in accordance with examples as disclosed herein. In some examples, aspects of the operations of 1805 may be performed by a CLI indication receiving manager 1240 as described with reference to FIG. 12.

At 1810, the method may include selectively adjusting one or more communications parameters associated with communications at the second base station based on the CLI indication. The operations of 1810 may be performed in accordance with examples as disclosed herein. In some examples, aspects of the operations of 1810 may be performed by a communications parameter manager 1245 as described with reference to FIG. 12.

At 1815, the method may include communicating with one or more wireless devices in accordance with the one or more adjusted communications parameters. The operations of 1815 may be performed in accordance with examples as disclosed herein. In some examples, aspects of the operations of 1815 may be performed by a UE communicating manager 1250 as described with reference to FIG. 12.

The following provides an overview of aspects of the present disclosure:

Aspect 1: A method for wireless communication at a first relay UE, comprising: receiving a first message comprising a CLI indication associated with CLI experienced by a first base station which is associated with signals transmitted by a second base station; generating, at least in part in response to the first message, a second message including the CLI indication; and transmitting the second message comprising the CLI indication to the second base station, to a second relay UE for relay to the second base station, or both.

Aspect 2: The method of aspect 1, further comprising: receiving, via the first base station, the second base station, or both, control signaling including an indication of a resource to relay the CLI indication, wherein the second message is generated in response to the control signaling, and wherein the second message is transmitted within the resource.

Aspect 3: The method of any of aspects 1 through 2, further comprising: receiving, via the first base station, the second base station, or both, control signaling including one or more relay selection criteria for relaying the CLI indication, wherein the first relay UE generates and transmits the second message based at least in part on a satisfaction of the one or more relay selection criteria.

Aspect 4: The method of aspect 3, wherein the satisfaction of the one or more relay selection criteria is based at least in part on a first signal strength associated with signals received at the first relay UE from the first base station, a second signal strength associated with signals received at the first relay UE from the second base station, or both, satisfying a threshold signal strength.

Aspect 5: The method of any of aspects 1 through 4, further comprising: transmitting the second message based at least in part on a comparison of a first priority associated with receiving and forwarding the CLI indication and a second priority associated with additional traffic that is to be transmitted or received by the first relay UE.

Aspect 6: The method of aspect 5, further comprising: receiving, from the first base station, the second base station, or both, an indication of a priority configuration associated with a relative priority between the CLI indication and the additional traffic, wherein the comparison is based at least in part on the priority configuration.

Aspect 7: The method of any of aspects 1 through 6, further comprising: receiving control signaling including an indication of a set of power control parameters associated with communications performed with the second base station, wherein the second message is transmitted to the second base station in accordance with the set of power control parameters.

Aspect 8: The method of aspect 7, wherein the control signaling including the indication of the set of power control parameters is received via the first base station, the second base station, or both, and the set of power control parameters includes a transmit power value, an alpha value, a closed loop index, a PL RS, or any combination thereof.

Aspect 9: The method of any of aspects 1 through 8, further comprising: receiving, from the first base station, a downlink message associated with a beam management procedure performed between the first relay UE and the first base station, wherein the first message is received from the first base station based at least in part on a receive beam at the first relay UE that was determined in accordance with the beam management procedure.

Aspect 10: The method of any of aspects 1 through 9, further comprising: receiving, from the first base station, the second base station, or both, a downlink message associated with a beam management procedure performed between the first relay UE the first base station or the second base station, respectively, wherein the second message is transmitted to the second base station based at least in part on a transmit beam at the first relay UE that was determined in accordance with the beam management procedure.

Aspect 11: The method of any of aspects 1 through 10, further comprising: receiving beam management information associated with identifying a transmit beam at the first relay UE for transmitting the second message, wherein the second message is transmitted based at least in part on the transmit beam that is identified in accordance with the beam management information.

Aspect 12: The method of any of aspects 1 through 11, further comprising: receiving, from the second relay UE, a sidelink message associated with a beam management procedure performed between the first relay UE and the second relay UE, wherein the second message is transmitted to the second relay UE based at least in part on a transmit beam at the first relay UE that was determined in accordance with the beam management procedure, and wherein the second message includes an indication for the second relay UE to relay the CLI indication to the second base station.

Aspect 13: The method of any of aspects 1 through 12, further comprising: receiving the first message from the first base station, wherein the first message includes an identifier associated with the second base station; and transmitting the second message to the second base station based at least in part on the identifier.

Aspect 14: The method of any of aspects 1 through 13, wherein the first message further includes an additional CLI indication associated with additional CLI experienced by the first base station which is associated with signals transmitted by a third base station, the method further comprising: generating, at least in part in response to the first message, a third message including the additional CLI indication; and transmitting the third message comprising the additional CLI indication to the third base station.

Aspect 15: The method of aspect 14, wherein the second message is transmitted within a first TTI and the third message is transmitted within a second TTI different from the first TTI, or wherein the second message is transmitted via a first transmit beam associated with a first spatial orientation and the third message is transmitted via a second transmit beam associated with a second spatial orientation different from the first spatial orientation Aspect 16: The method of any of aspects 1 through 15, further comprising: identifying, based at least in part on the first message, that the first relay UE is unable to communicate with the second base station, receiving, from the second relay UE and based at least in part on the identifying, a sidelink message including an indication of at least one serving base station associated with the second relay UE, the at least one serving base station including the second base station; and transmitting the second message to the second relay UE based at least in part on receiving the sidelink message, wherein the second message includes an indication for the second relay UE to relay the CLI indication to the second base station.

Aspect 17: The method of aspect 16, further comprising: transmitting a request to at least the second relay UE based at least in part on identifying that the first relay UE is unable to communicate with the second base station, wherein the sidelink message is received in response to the request.

Aspect 18: The method of any of aspects 16 through 17, further comprising: receiving a feedback message from the second relay UE in response to the second message.

Aspect 19: The method of any of aspects 1 through 18, wherein the first message is received from a second relay UE and wherein the first relay UE is served by the second base station, the method further comprising: transmitting a scheduling request to the second base station based at least in part on receiving the first message; receiving, from the second base station in response to the scheduling request, a grant including a set of resources, wherein the second message is transmitted to the second base station within the set of resources.

Aspect 20: The method of any of aspects 1 through 19, wherein the first message is received from the second relay UE and wherein the first relay UE is served by the second base station, the method further comprising: transmitting, to the second base station, a random access message of a random access procedure between the first relay UE and the second base station, wherein the random access message includes a request for a grant; and receiving, from the second base station in response to the random access message, the grant including a set of resources, wherein the second message is transmitted to the second base station within the set of resources.

Aspect 21: The method of any of aspects 1 through 20, wherein the first message is received from a second relay UE and wherein the first relay UE is served by the second base station, the method further comprising: transmitting, to the second base station, a random access message of a random access procedure between the first relay UE and the second base station, wherein the second message including the CLI indication comprises the random access message.

Aspect 22: A method for wireless communication at a first base station, comprising: receiving a signal from a second base station; measuring CLI at the first base station that is associated with the signal received from the second base station; and transmitting a message including a CLI indication to a relay UE served by the first base station based at least in part on the measured CLI satisfying an interference threshold, wherein the CLI indication is transmitted to the relay UE for relay to the second base station.

Aspect 23: The method of aspect 22, further comprising: transmitting, to the relay UE, control signaling including an indication of a resource to relay the CLI indication to the second base station, an additional relay UE, or both.

Aspect 24: The method of any of aspects 22 through 23, further comprising: transmitting, to the relay UE, control signaling including one or more relay selection criteria for relaying the CLI indication.

Aspect 25: The method of any of aspects 22 through 24, further comprising: transmitting, to the relay UE, an indication of a priority configuration associated with a relative priority between the CLI indication and additional traffic at the relay UE.

Aspect 26: The method of any of aspects 22 through 25, further comprising: transmitting, to the relay UE, control signaling including an indication of a set of power control parameters associated with communications performed with the second base station, wherein the set of power control parameters includes a transmit power value, an alpha value, a closed loop index, a PL RS, or any combination thereof.

Aspect 27: A method for wireless communication at a second base station, comprising: receiving, from a relay UE that is served by the second base station, a message including a CLI indication associated with CLI experienced at a first base station that is attributable to signals transmitted by the second base station; selectively adjusting one or more communications parameters associated with communications at the second base station based at least in part on the CLI indication; and communicating with one or more wireless devices in accordance with the one or more adjusted communications parameters.

Aspect 28: The method of aspect 27, further comprising: transmitting, to the relay UE, control signaling including an indication of a resource to relay the CLI indication to the second base station, wherein the message is received within the resource.

Aspect 29: The method of any of aspects 27 through 28, further comprising: transmitting, to the relay UE, control signaling including an indication of a set of power control parameters associated with communications performed with the second base station, wherein the set of power control parameters includes a transmit power value, an alpha value, a closed loop index, a PL RS, or any combination thereof.

Aspect 30: The method of any of aspects 27 through 29, further comprising: transmitting, to the relay UE, a downlink message associated with a beam management procedure performed between the relay UE and the second base station, wherein the message is transmitted by the relay UE to the second base station based at least in part on a transmit beam at the relay UE that was determined in accordance with the beam management procedure.

Aspect 31: The method of any of aspects 27 through 30, wherein the one or more communications parameters comprise a transmit beam used to transmit signals by the second base station, a transmit power associated with signals transmitted by the second base station, resource configurations including uplink and downlink resources used for communications at the second base station, or any combination thereof.

Aspect 32: An apparatus comprising a processor; memory coupled with the processor; and instructions stored in the memory and executable by the processor to cause the apparatus to perform a method of any of aspects 1 through 21.

Aspect 33: An apparatus comprising at least one means for performing a method of any of aspects 1 through 21.

Aspect 34: A non-transitory computer-readable medium storing code the code comprising instructions executable by a processor to perform a method of any of aspects 1 through 21.

Aspect 35: An apparatus comprising a processor; memory coupled with the processor; and instructions stored in the memory and executable by the processor to cause the apparatus to perform a method of any of aspects 22 through 26.

Aspect 36: An apparatus comprising at least one means for performing a method of any of aspects 22 through 26.

Aspect 37: A non-transitory computer-readable medium storing code the code comprising instructions executable by a processor to perform a method of any of aspects 22 through 26.

Aspect 38: An apparatus comprising a processor; memory coupled with the processor; and instructions stored in the memory and executable by the processor to cause the apparatus to perform a method of any of aspects 27 through 31.

Aspect 39: An apparatus comprising at least one means for performing a method of any of aspects 27 through 31.

Aspect 40: A non-transitory computer-readable medium storing code the code comprising instructions executable by a processor to perform a method of any of aspects 27 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first relay user equipment (UE), comprising:
   a processor;

memory coupled with the processor; and
instructions stored in the memory and executable by the processor to cause the apparatus to:
receive a first message comprising a cross-link interference indication associated with cross-link interference experienced by a first base station which is associated with signals transmitted by a second base station;
generate, at least in part in response to the first message, a second message including the cross-link interference indication; and
transmit the second message comprising the cross-link interference indication to the second base station, to a second relay UE for relay to the second base station, or both.

2. The apparatus of claim 1, wherein the instructions are further executable by the processor to cause the apparatus to:
receive, via the first base station, the second base station, or both, control signaling including an indication of a resource to relay the cross-link interference indication, wherein the second message is generated in response to the control signaling, and wherein the second message is transmitted within the resource.

3. The apparatus of claim 1, wherein the instructions are further executable by the processor to cause the apparatus to:
receive, via the first base station, the second base station, or both, control signaling including one or more relay selection criteria for relaying the cross-link interference indication, wherein the first relay UE generates and transmits the second message based at least in part on a satisfaction of the one or more relay selection criteria.

4. The apparatus of claim 3, wherein the satisfaction of the one or more relay selection criteria is based at least in part on a first signal strength associated with signals received at the first relay UE from the first base station, a second signal strength associated with signals received at the first relay UE from the second base station, or both, satisfying a threshold signal strength.

5. The apparatus of claim 1, wherein the instructions are further executable by the processor to cause the apparatus to:
transmit the second message based at least in part on a comparison of a first priority associated with receiving and forwarding the cross-link interference indication and a second priority associated with additional traffic that is to be transmitted or received by the first relay UE.

6. The apparatus of claim 5, wherein the instructions are further executable by the processor to cause the apparatus to:
receive, from the first base station, the second base station, or both, an indication of a priority configuration associated with a relative priority between the cross-link interference indication and the additional traffic, wherein the comparison is based at least in part on the priority configuration.

7. The apparatus of claim 1, wherein the instructions are further executable by the processor to cause the apparatus to:
receive control signaling including an indication of a set of power control parameters associated with communications performed with the second base station, wherein the second message is transmitted to the second base station in accordance with the set of power control parameters.

8. The apparatus of claim 7, wherein the control signaling including the indication of the set of power control parameters is received via the first base station, the second base station, or both, and wherein the set of power control parameters includes a transmit power value, an alpha value, a closed loop index, a path loss reference signal, or any combination thereof.

9. The apparatus of claim 1, wherein the instructions are further executable by the processor to cause the apparatus to:
receive, from the first base station, a downlink message associated with a beam management procedure performed between the first relay UE and the first base station, wherein the first message is received from the first base station based at least in part on a receive beam at the first relay UE that was determined in accordance with the beam management procedure.

10. The apparatus of claim 1, wherein the instructions are further executable by the processor to cause the apparatus to:
receive, from the first base station, the second base station, or both, a downlink message associated with a beam management procedure performed between the first relay UE the first base station or the second base station, respectively, wherein the second message is transmitted to the second base station based at least in part on a transmit beam at the first relay UE that was determined in accordance with the beam management procedure.

11. The apparatus of claim 1, wherein the instructions are further executable by the processor to cause the apparatus to:
receive beam management information associated with identifying a transmit beam at the first relay UE for transmitting the second message, wherein the second message is transmitted based at least in part on the transmit beam that is identified in accordance with the beam management information.

12. The apparatus of claim 1, wherein the instructions are further executable by the processor to cause the apparatus to:
receive, from the second relay UE, a sidelink message associated with a beam management procedure performed between the first relay UE and the second relay UE, wherein the second message is transmitted to the second relay UE based at least in part on a transmit beam at the first relay UE that was determined in accordance with the beam management procedure, and wherein the second message includes an indication for the second relay UE to relay the cross-link interference indication to the second base station.

13. The apparatus of claim 1, wherein the instructions are further executable by the processor to cause the apparatus to:
receive the first message from the first base station, wherein the first message includes an identifier associated with the second base station; and
transmit the second message to the second base station based at least in part on the identifier.

14. The apparatus of claim 1, wherein the first message further includes an additional cross-link interference indication associated with additional cross-link interference experienced by the first base station which is associated with signals transmitted by a third base station, and wherein the instructions are further executable by the processor to cause the apparatus to:
generate, at least in part in response to the first message, a third message including the additional cross-link interference indication; and
transmit the third message comprising the additional cross-link interference indication to the third base station.

15. The apparatus of claim 14,
wherein the second message is transmitted within a first transmission time interval and the third message is transmitted within a second transmission time interval different from the first transmission time interval, or wherein the second message is transmitted via a first transmit beam associated with a first spatial orientation and the third message is transmitted via a second transmit beam associated with a second spatial orientation different from the first spatial orientation.

16. The apparatus of claim 1, wherein the instructions are further executable by the processor to cause the apparatus to:

identify, based at least in part on the first message, that the first relay UE is unable to communicate with the second base station, receive, from the second relay UE and based at least in part on the identifying, a sidelink message including an indication of at least one serving base station associated with the second relay UE, the at least one serving base station including the second base station; and transmit the second message to the second relay UE based at least in part on receiving the sidelink message, wherein the second message includes an indication for the second relay UE to relay the cross-link interference indication to the second base station.

17. The apparatus of claim 16, wherein the instructions are further executable by the processor to cause the apparatus to:

transmit a request to at least the second relay UE based at least in part on identifying that the first relay UE is unable to communicate with the second base station, wherein the sidelink message is received in response to the request.

18. The apparatus of claim 16, wherein the instructions are further executable by the processor to cause the apparatus to:

receive a feedback message from the second relay UE in response to the second message.

19. The apparatus of claim 1, wherein the first relay UE is served by the second base station, and wherein the instructions are further executable by the processor to cause the apparatus to:

transmit a scheduling request to the second base station based at least in part on receiving the first message;

receive, from the second base station in response to the scheduling request, a grant including a set of resources, wherein the second message is transmitted to the second base station within the set of resources.

20. The apparatus of claim 1, wherein the first message is received from the second relay UE and wherein the first relay UE is served by the second base station, and wherein the instructions are further executable by the processor to cause the apparatus to:

transmit, to the second base station, a random access message of a random access procedure between the first relay UE and the second base station, wherein the random access message includes a request for a grant; and receive, from the second base station in response to the random access message, the grant including a set of resources, wherein the second message is transmitted to the second base station within the set of resources.

21. The apparatus of claim 1, wherein the first message is received from a second relay UE and wherein the first relay UE is served by the second base station, and wherein the instructions are further executable by the processor to cause the apparatus to:

transmit, to the second base station, a random access message of a random access procedure between the first relay UE and the second base station, wherein the second message including the cross-link interference indication comprises the random access message.

22. An apparatus for wireless communication at a first base station, comprising:

a processor;

memory coupled with the processor; and instructions stored in the memory and executable by the processor to cause the apparatus to:

receive a signal from a second base station;

measure cross-link interference at the first base station that is associated with the signal received from the second base station; and transmit a message including a cross-link interference indication to a relay user equipment (UE) served by the first base station based at least in part on the measured cross-link interference satisfying an interference threshold, wherein the cross-link interference indication is transmitted to the relay UE for relay to the second base station.

23. The apparatus of claim 22, wherein the instructions are further executable by the processor to cause the apparatus to:

transmit, to the relay UE, control signaling including an indication of a resource to relay the cross-link interference indication to the second base station, an additional relay UE, or both.

24. The apparatus of claim 22, wherein the instructions are further executable by the processor to cause the apparatus to:

transmit, to the relay UE, control signaling including one or more relay selection criteria for relaying the cross-link interference indication.

25. The apparatus of claim 22, wherein the instructions are further executable by the processor to cause the apparatus to:

transmit, to the relay UE, an indication of a priority configuration associated with a relative priority between the cross-link interference indication and additional traffic at the relay UE.

26. The apparatus of claim 22, wherein the instructions are further executable by the processor to cause the apparatus to:

transmit, to the relay UE, control signaling including an indication of a set of power control parameters associated with communications performed with the second base station, wherein the set of power control parameters includes a transmit power value, an alpha value, a closed loop index, a path loss reference signal, or any combination thereof.

27. An apparatus for wireless communication at a second base station, comprising:

a processor;

memory coupled with the processor; and instructions stored in the memory and executable by the processor to cause the apparatus to:

receive, from a relay user equipment (UE) that is served by the second base station, a message including a cross-link interference indication associated with cross-link interference experienced at a first base station that is attributable to signals transmitted by the second base station;

selectively adjust one or more communications parameters associated with communications at the second base station based at least in part on the cross-link interference indication; and communicate with one or more wireless devices in accordance with the one or more adjusted communications parameters.

28. The apparatus of claim 27, wherein the instructions are further executable by the processor to cause the apparatus to:

transmit, to the relay UE, control signaling including an indication of a resource to relay the cross-link interference indication to the second base station, wherein the message is received within the resource.

29. The apparatus of claim 27, wherein the instructions are further executable by the processor to cause the apparatus to:

transmit, to the relay UE, control signaling including an indication of a set of power control parameters associated with communications performed with the second base station, wherein the set of power control parameters includes a transmit power value, an alpha value, a closed loop index, a path loss reference signal, or any combination thereof.

30. A method for wireless communication at a first relay user equipment (UE), comprising:

receiving a first message comprising a cross-link interference indication associated with cross-link interference experienced by a first base station which is associated with signals transmitted by a second base station;

generating, at least in part in response to the first message, a second message including the cross-link interference indication; and transmitting the second message comprising the cross-link interference indication to the second base station, to a second relay UE for relay to the second base station, or both.

* * * * *